United States Patent
Greiff et al.

(10) Patent No.: US 12,517,523 B2
(45) Date of Patent: Jan. 6, 2026

(54) SYSTEM AND METHOD FOR CONTROLLING MOTION OF A VEHICLE IN A STOCHASTIC DISTURBANCE FIELD

(71) Applicant: Mitsubishi Electric Research Laboratories, Inc., Cambridge, MA (US)

(72) Inventors: Marcus Greiff, Cambridge, MA (US); Stefano Di Cairano, Newton, MA (US); Saleh Nabi, Wilmington, MA (US); Abraham Vinod, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 354 days.

(21) Appl. No.: 18/158,730

(22) Filed: Jan. 24, 2023

(65) Prior Publication Data

US 2024/0248475 A1    Jul. 25, 2024

(51) Int. Cl.
*G05D 1/00*    (2024.01)
*B64C 39/02*    (2023.01)
(Continued)

(52) U.S. Cl.
CPC ........... *G05D 1/106* (2019.05); *B64C 39/024* (2013.01); *B64U 10/00* (2023.01); *G05D 1/0206* (2013.01);
(Continued)

(58) Field of Classification Search
CPC .... G05D 1/106; G05D 1/0206; G05D 1/0212; G05D 2111/17; G05D 1/242;
(Continued)

(56) References Cited

U.S. PATENT DOCUMENTS 7,231,294 B2    6/2007  Bodin et al.
11,029,709 B1*  6/2021  Stepanyan ........... G05D 1/1062
                        (Continued)

FOREIGN PATENT DOCUMENTS

CN    107084723 B  *  7/2019  ........... G01C 21/203
CN    112083663 A  *  12/2020
                    (Continued)

OTHER PUBLICATIONS

D. Hunter Hale and G. Michael Youngblood, "Full 3D Spatial Decomposition for the Generation of Navigation Meshes", Fifth Artificial Intelligence and Interactive Digital Entertainment Conference, vol. 5, 2009, pp. 142-147 (Year: 2009).*

(Continued)

*Primary Examiner* — Rachid Bendidi
*Assistant Examiner* — Neit J. Nieves Flores
(74) *Attorney, Agent, or Firm* — Gene Vinokur

(57) ABSTRACT

The present disclosure discloses a system and method for controlling motion of a vehicle. The method comprises collecting a signal indicative of objectives of the motion and a value of the disturbances, and minimizing an objective function subject to constraints defined by the objectives of the motion to produce optimized values of parameters of a sequence of splines. The method further comprises controlling the motion of the vehicle based on a model of differentially flat dynamics of the vehicle according to an optimal path defined by the optimized values of the parameters of the sequence of splines.

20 Claims, 20 Drawing Sheets

(51) Int. Cl.
 *B64U 10/00* (2023.01)
 *G05D 1/246* (2024.01)
 *G05D 1/644* (2024.01)

(52) U.S. Cl.
 CPC ....... *G05D 1/0212* (2013.01); *B64U 2201/00* (2023.01)

(58) Field of Classification Search
 CPC .............. G05D 1/622; G05D 2105/89; G05D 2109/20; G05D 1/2465; G05D 1/606; G05D 1/644; B64C 39/024; B64U 10/00; B64U 2201/00; G01C 21/20
 USPC .................................................. 701/3; 73/178
 See application file for complete search history.

(56) References Cited

U.S. PATENT DOCUMENTS

| | | |
|---|---|---|
| 2016/0284221 A1 | 9/2016 | Hinkle et al. |
| 2019/0086925 A1* | 3/2019 | Fan ...................... G05D 1/0088 |

FOREIGN PATENT DOCUMENTS

| | | | |
|---|---|---|---|
| JP | 2019079237 A | * | 5/2019 |
| KR | 20170086448 A | * | 7/2017 |

OTHER PUBLICATIONS

Daniel Mellinger and Vijay Kumar, "Minimum Snap Trajectory Generation and Control for Quadrotors", 2011 IEEE International Conference on Robotics and Automation, 2011, pp. 2520-2525 (Year: 2011).*

Richter 2016 polynomial trajectory planning for aggressive quadrotor flight in dense indoor environments, Richter, Charles and Bry, Adam and Roy, Nicholas,. Robotics research, p. 649-666, 2016. Springer.

* cited by examiner

SYSTEM AND METHOD FOR CONTROLLING MOTION OF A VEHICLE IN A STOCHASTIC DISTURBANCE FIELD

TECHNICAL FIELD

The present disclosure relates generally to control systems, and more particularly to a system and a method for controlling motion of a vehicle in a stochastic disturbance field.

BACKGROUND

Motion planning concerns the computation of feasible motions for a vehicle to move the vehicle from one state (position, velocity, and/or rotation) in an initial set to another state in a terminal set. Motion planning problems often include constraints to ensure safety and are commonly formulated as optimization problems wherein quantities such as time and fuel consumption are minimized. However, there are many domain-specific disturbances that affect the accuracy of such motion (or path) planning.

For example, when operating the vehicle, such as Unmanned Aerial Vehicle (UAV), in outdoor environments, several disturbances affect an accuracy of maneuvers and an overall cost of a mission of the UAV. Some disturbances can be assumed to be partially known and incorporated in the path planning of the UAV to aid its mission. One such disturbance is wind, which may be known in a low-frequency domain from meteorological forecasts or measured in real-time from various sensors providing higher-frequency information. Taking such information of the wind into account is critical for safe and efficient autonomous missions with the UAVs.

Several path planning methods rely on mathematical properties of differential equations that govern a motion of the vehicle by computing smooth trajectories in a lower-dimensional space. For certain types of vehicles that are differentially flat, such as surface vessels, UAVs and differentially driven ground vehicles, such smooth trajectories can be expanded to positions, velocities, accelerations, rotations, rotation rates, forces, and torques of the vehicle at any point in time without numerical integration. Planning for smoothness in this way limits flexibility of a path planner, as a cost function generally has no physical interpretation, but facilitates fast path planning schemes and efficient replanning approaches. While ignoring effects of the disturbances, and not directly addressing minimization of physical quantities of interest, such methods are widely used in practice.

The incorporation of the disturbances and additional constraints in the path planning is generally carried out on shorter time horizons, because involving the vehicle's nonlinear differential equations and discretizing a continuous state trajectory in a set of points results in more optimization variables per time unit of the path plan. As such, the path planners that explicitly constrain the motion to behave as the vehicle subject to the disturbances may have to operate with the shorter time horizons, and often with first order approximations of nonlinear constraints.

Further, as uncertainty of any prediction of wind speed (disturbance) grows significantly in time, the wind is typically treated over the shorter time horizons. However, low-frequency component of the wind speeds can be known with reasonable certainty, and emerging technologies can be leveraged to estimate the wind speeds over large areas using, for instance, light detection and ranging (LiDAR). By interpolation and reconstruction, it is possible to leverage wind information for high-frequency replanning of the path over longer time scales. However, to implement such an approach, algorithms that plan for the smoothness need to be extended to models that incorporate an interaction between the vehicle and a vector field of the disturbance.

Accordingly, there is a need for a system and a method for the path planning of the vehicle, that can accommodate disturbance models for high-frequency planning.

SUMMARY

Some embodiments are based on the realization that current methods of path planning for vehicles are either fast and operate over long time horizons when planning for smoothness without incorporation of disturbance models, or more computationally heavy and can operate with descriptions of disturbances over shorter time horizons while minimizing physically relevant costs. One embodiment therefore complements a smoothness planner with an additional cost, which describes how a system may behave under influence of a disturbance model in terms of a total power used by actuators of the vehicle.

In some embodiments, where the vehicle is an Unmanned Aerial Vehicle (UAV), the cost is expressed as a total thrust used by the actuators and retains the same mathematical properties as an original minimum snap cost function (convexity) under certain assumptions, permitting fast offline computation or online re-replanning of the UAV motion subject to a disturbance (such as wind). Even if the disturbance is only known in a probabilistic sense, certain classes of wind models yield a thrust cost that is known in its first two moments, mean and variance. Both the mean and the variance of the thrust cost retain the same properties as the original minimum snap cost function (convexity).

Therefore, some embodiments formulate a planning problem with a deterministic wind model (no uncertainty) while other embodiments minimize effects of a stochastic wind model (with uncertainty). In both cases, the thrust cost associated with the wind can be combined with a smoothness cost, as well as costs related to a total time of executing a maneuver. In some embodiments, it is possible to minimize a cost comprised of smoothness, thrust used by the UAV, and time, while retaining advantageous computational properties (strict biconvexity).

Some embodiments of the present disclosure formulate and solve an optimization problem using wind data from meteorological forecasts, or estimates of the wind from sensors such as LiDAR's and anemometers. Additionally or alternatively, some embodiments leverage Computer Fluid Dynamics (CFD) simulations to construct an expected wind vector field subject to boundary conditions and geometries in a map where a mission of the UAV takes place.

In some embodiments, the disturbance model (such as a wind disturbance for the UAV) is purely deterministic and done by means of a parametric regression. In some other embodiments, uncertainty is ascribed directly to samples of the disturbances and propagated to the stochastic disturbance model that is subsequently used by the planning problem, which may be done either using parametric or non-parametric regression methods in regions of space where the vehicle is to operate. As such, a representation of the disturbance is contingent on description of the space in which the vehicle is to operate.

In the regions of space (also known as free space) where the vehicle is to operate, the disturbance model is regressed to a representation local to sets of free space. This choice, among other things, facilitates an evaluation of an objective function related to how the vehicle interacts with the disturbance while retaining advantageous mathematical properties of the objective function.

In some embodiments, the free space in which the vehicle operates is an area, in others it is a volume, and in yet other cases, it is an interior of a higher-dimensional set defined in any subset of a flat output space associated with the vehicle. The environment in which the vehicle operates is represented in two- or three-dimensional space using meshes of vertices, edges, and faces. The free space in such a model of the environment is decomposed into convex polyhedral sets, which constitute the free space of the vehicle. In some embodiments, the free space is computed by simple heuristics that start with finding mesh and attempting to eliminate edges (combine sets) in a greedy manner until no further combination is possible.

A union of the sets of free space can be used to constrain the motion of the vehicle, e.g., by constraining the vehicle to reside within one of the free space sets every point in time. Alternatively, or additionally, the motion can be constrained to pass through an intersection of connected sets of free space. Also, the motion can be further constrained to ensure it is continuous when switching between segments of the motion plan. Additionally, or alternatively, distinct points along a path such as a starting point and a terminal point, can be constrained to pre-defined sets the space that the path is defined. When combined, these constraints can be used to support a wide variety of tasks.

Some embodiments are based on the realization that computation power may be limited in production grade control units used in practice, and that a motion planner that leverages disturbance models for offline or online planning can be run on a separate server. In such an embodiment, the vehicle provides information to the server which act as constraints in the motion planning, and the server formulates and solves the optimization problem before transmitting the parameters of the motion plan back to the vehicle. The vehicle subsequently uses one or more actuators to control itself along the motion plan.

Consequently, one embodiment encloses a planner which can operate either offline or perform online replanning, taking disturbances such as the wind into account and providing a motion plan as a parametric smooth curve which is designed to minimize any combination of total variation of higher derivatives, the total thrust used by the vehicle and the time taken to execute the motion plan.

Accordingly, one embodiment discloses a control system for controlling motion of a vehicle. The control system comprises a memory configured to store an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle; and a processor coupled with executable instructions, when executed by the processor, cause the control system to: collect a signal indicative of objectives of the motion and the value of the disturbances; minimize the objective function subject to constraints defined by the objectives of the motion to produce optimized values of the parameters of the sequence of splines; and control the motion of the vehicle based on a model of differentially flat dynamics of the vehicle according to an optimal path defined by the optimized values of the parameters of the sequence of splines.

Accordingly, another embodiment discloses method for controlling motion of a vehicle, wherein the method uses a processor coupled to a memory storing an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle, the processor is coupled with stored instructions when executed by the processor carry out steps of the method. The method comprises collecting a signal indicative of objectives of the motion and the value of the disturbances; minimizing the objective function subject to constraints defined by the objectives of the motion to produce optimized values of the parameters of the sequence of splines; and controlling the motion of the vehicle based on a model of differentially flat dynamics of the vehicle according to an optimal path defined by the optimized values of the parameters of the sequence of splines.

Accordingly, yet another embodiment discloses a non-transitory computer readable storage medium embodied thereon a program executable by a processor for performing a method, the storage medium stores an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle, the program when executed by the processor carry out steps of the method. The method comprises collecting a signal indicative of objectives of the motion and the value of the disturbances; minimizing the objective function subject to constraints defined by the objectives of the motion to produce optimized values of the parameters of the sequence of splines; and controlling the motion of the vehicle based on a model of differentially flat dynamics of the vehicle according to an optimal path defined by the optimized values of the parameters of the sequence of splines.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
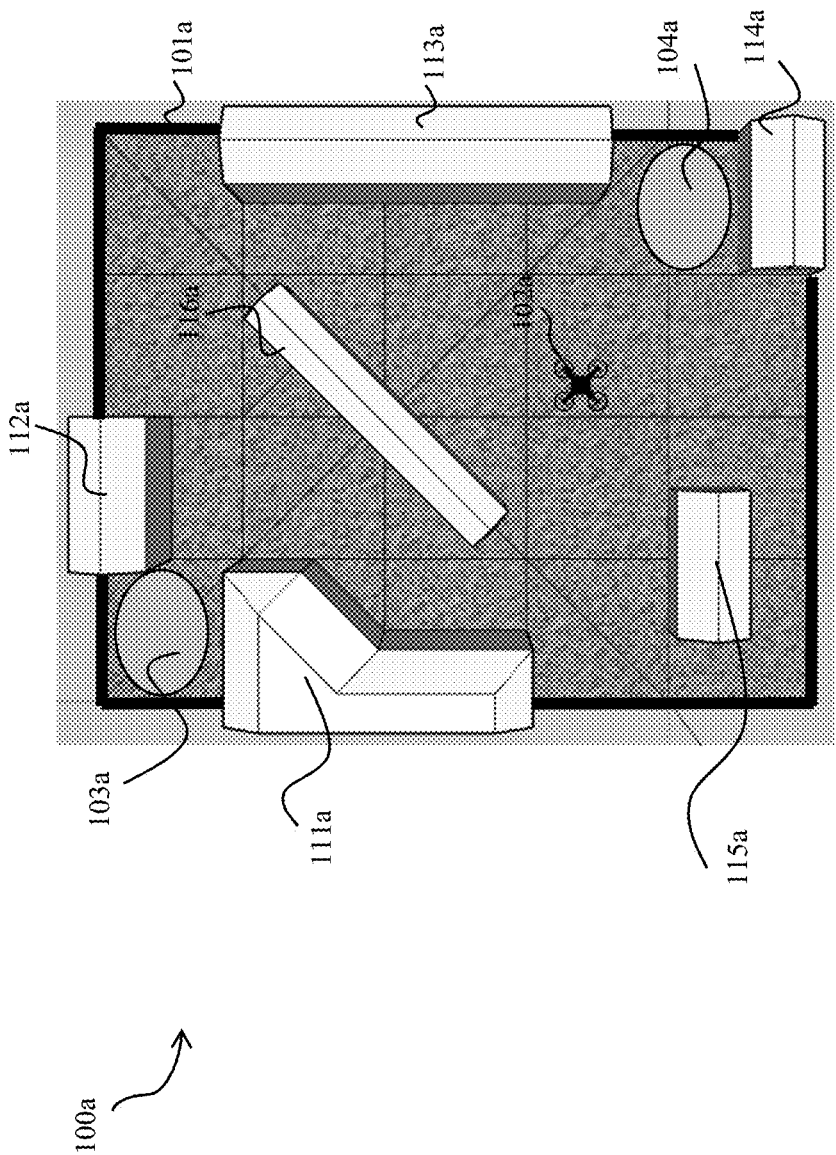
FIG. 1A illustrates an example of an environment where a vehicle is configured to execute a task, according to an embodiment of the present disclosure.

FIG. 1A illustrates an example of an environment 100a with a boundary 101a where a vehicle 102a is configured to execute a task, according to an embodiment of the present disclosure. The vehicle 102a may be an autonomous vehicle, a mobile robot, an aerial drone, a ground vehicle, an aerial vehicle, a water surface vehicle, or an underwater vehicle. It is an objective of some embodiments to determine a motion plan (i.e., a path) for the vehicle 102a from an initial state in a set 103a to a target state in a set 104a both defined in the environment 100a. In one embodiment, the vehicle 102a is given a task of reaching the target state, in other embodiments, the vehicle 102 is to move from a current state to the target state and back while exploring a designated part of the environment 100a. The state of the vehicle 102a may include one or a combination of a position of the vehicle 102a, an orientation of the vehicle 102a, a velocity of the vehicle 102a, or other states relating to its actuation.

The environment 100a includes obstacles 111a, 112a, 113a, 114a, 115a, and 116a. In this example, one or more obstacles of the obstacles 111a, 112a, 113a, 114a, 115a, and 116a are convex, such as the obstacle 112a, and others are non-convex, such as the obstacle 111a. The task's performance is contingent on satisfaction of constraints on the vehicle's 102a motion relating to the environment 100a. In other words, the performance of the task is subject to the constraints. Examples of such constraints include reaching the target state, avoiding collision with the obstacles 111a-116a (i.e., a vehicle-obstacle collision avoidance constraint), moving the vehicle 102a such that the state of the vehicle 102a (e.g., position) is within a pre-defined set of admissible states of the vehicle 102a (i.e., a keep-in constraint), and the like. For instance, an airborne vehicle, such as a drone, can be tasked to reach certain positions to inspect a structure while avoiding collisions with parts of the structure.

Figure 1B:
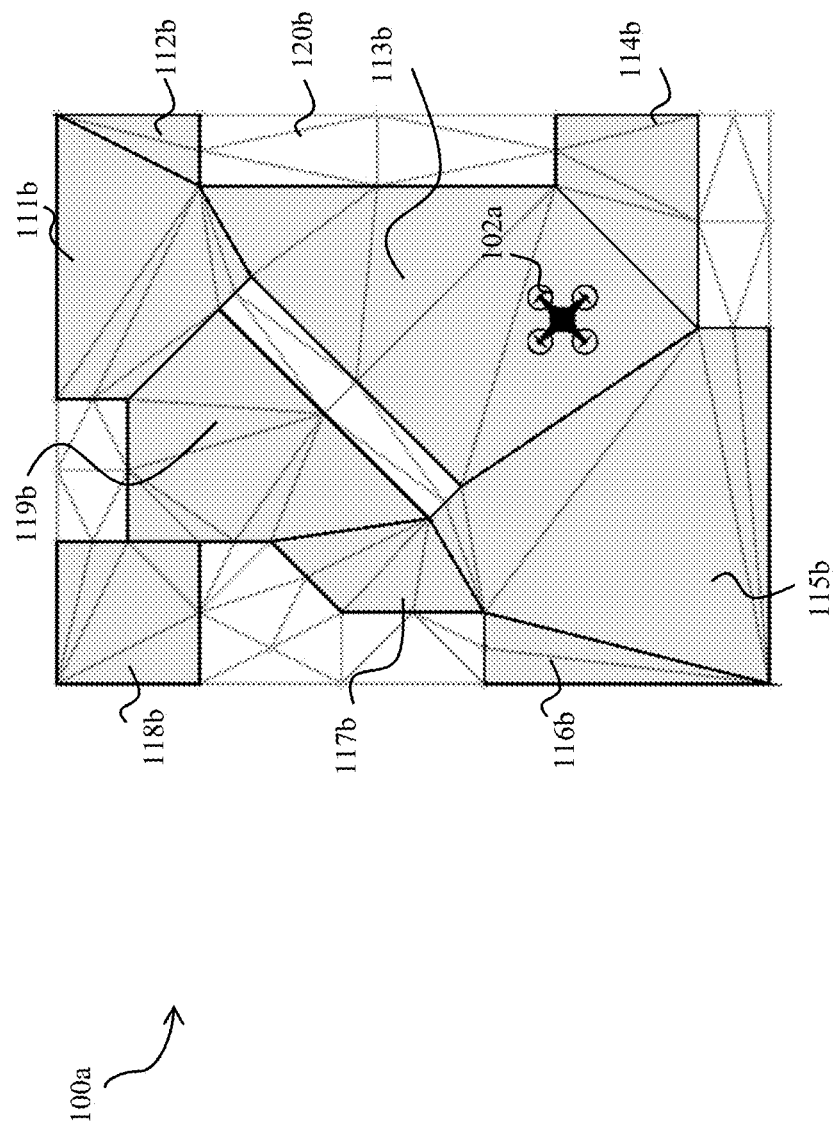
FIG. 1B illustrates decomposition of the environment into a union of free space sets, in which the vehicle is free to operate and move, according to an embodiment of the present disclosure.

FIG. 1B illustrates decomposition of the environment 100a into a union of free space sets, in which the vehicle 102a is free to operate and move, according to an embodiment of the present disclosure. In one embodiment, the decomposition of the environment 100a is executed by computing a mesh comprised of polyhedral sets 120b over the entire environment 100a, before subsequently combining these smaller sets 120b into larger sets 111b-119b. The larger sets 111b-119b form the union of free space sets. It is an object of some embodiments to determine a motion plan passing through the union of free space sets. An example of such a motion plan is described in FIG. 1C.

Figure 1C:
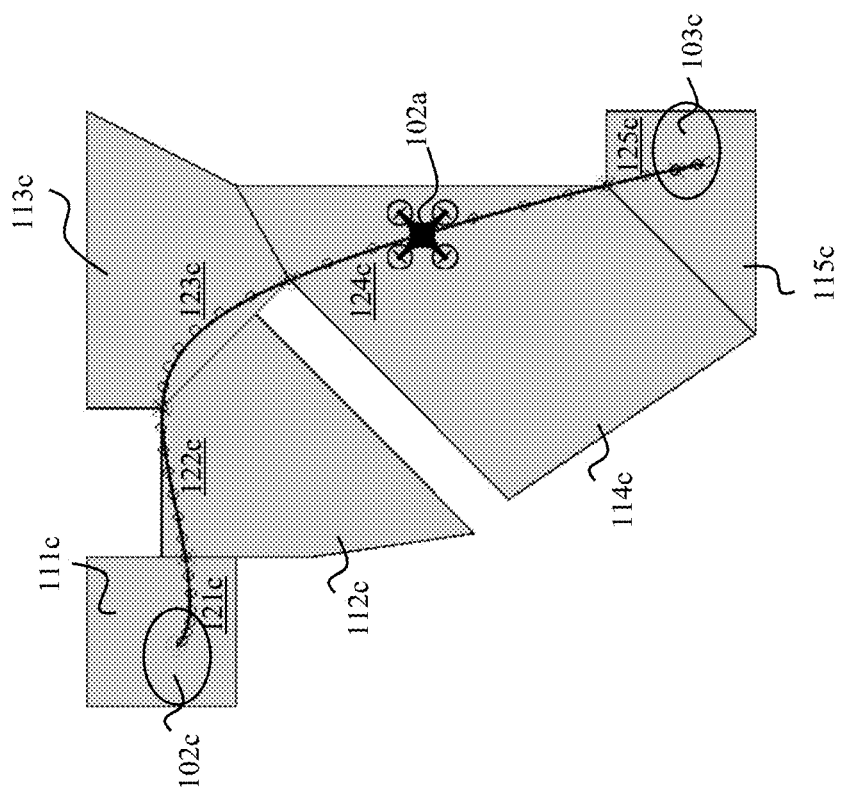
FIG. 1C illustrates an example motion plan of the vehicle, according to an embodiment of the present disclosure.

In FIG. 1C, a motion plan is depicted wherein the vehicle 102a is to move from a start region 102c to a terminal region 103c while passing through connected sets of free space 111c-115c. In this example, the motion plan is comprised of five segments 121c-125c. In some embodiments, the segments are constrained to reside on a designated subset of free space. For instance, the segment 121c is confined to the set 111c. In other embodiments, the motion is constrained to the intersection of two connected sets of free space, such that an end point of the segment 121c is constrained to an intersection of the sets 111c and 112c. In yet other embodiments, both methods of constraining the segments are used simultaneously.

In addition to the constraints on the motion itself, additional constraints are imposed to ensure that the motion is continuous when switching between the different segments of the motion plan. For the vehicles that are differentially flat, such as a differentially driven mobile robot, a quadrotor aerial vehicle, a water surface vehicle, or an underwater vehicle, a sufficient degree of smoothness suffices to generate motions in a flat output space that result in dynamically feasible trajectories when transformed into a state-space and control signal space of the vehicle. For example, with a quadrotor unmanned aerial vehicle, it suffices to have positions of the trajectory be five times differentiable at each spline end point to ensure that the trajectory can be expanded into the positions, velocities, rotation, rotation velocities, rotation accelerations, forces, and thrusts of the quadrotor unmanned aerial vehicle.

Some embodiments are based on the recognition that the vehicle 102a in the environment 100a may be subject to disturbances. For example, when operating the vehicle 102a, such as Unmanned Aerial Vehicle (UAV), in outdoor environments, the disturbances, such as wind, may be acting on the vehicle 102a. The disturbances affect an accuracy of maneuvers and an overall cost of a mission of the UAV. Taking information of the wind into account is critical for safe autonomous missions with the UAVs. Likewise, for the water surface vehicle, the disturbances include wind speeds and ocean currents in two or three dimensions. To that end, it is an object of some embodiments to provide a control system that determines the motion plan for the vehicle 102a by considering the disturbances acting on the vehicle 102a, in addition to the constraints. Such a control system is described below in FIG. 1D.

Figure 1D:
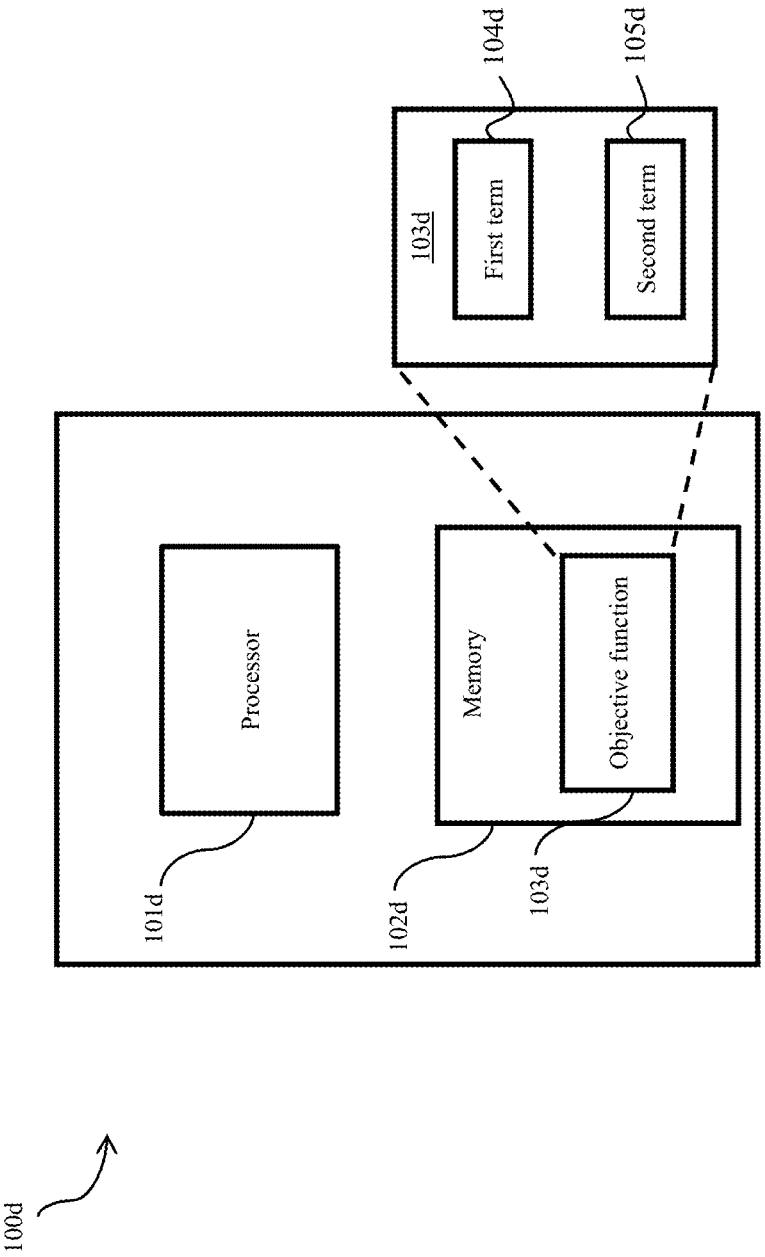
FIG. 1D illustrates a block diagram of a control system for controlling motion of the vehicle, according to some embodiments of the present disclosure.

FIG. 1D illustrates a block diagram of a control system 100d for controlling the motion of the vehicle 102a, according to some embodiments of the present disclosure. The control system 100d includes a processor 101d and a memory 102d. The processor 101d may be a single core processor, a multi-core processor, a computing cluster, or any number of other configurations. The memory 102d may include random access memory (RAM), read only memory (ROM), flash memory, or any other suitable memory systems. Additionally, in some embodiments, the memory 102d may be implemented using a hard drive, an optical drive, a thumb drive, an array of drives, or any combinations thereof.

The memory 102d is configured to store an objective function 103d of the parameters defining a sequence of splines (e.g., the sets of free space 111c-115c) representing a path for the motion of the vehicle 102a. The objective function 103d includes a first term 104d and a second term 105d. The first term 104d of the objective function 103d includes a total variation of the splines and their higher order derivatives. The second term 105d of the objective function 103d includes an energy function parameterized in the parameters of the sequence of splines and the disturbances acting on the vehicle 102a. In an embodiment, the vehicle is an aerial vehicle, and the disturbance is modeled as the wind and the energy function captures a change in thrust and torque caused by a movement of the vehicle 102a in a field of the disturbance as a function of motion parameters. In another embodiment, the vehicle is the water surface vehicle, and the disturbance is modeled as the wind and the ocean currents, and the energy function of captures a change in thrust and torque caused by a movement of the vehicle 102a in a field of the disturbance as a function of the motion parameters. In yet another embodiment, the vehicle is the underwater vehicle, and the disturbance is modeled as the ocean currents, and the energy function captures a change in thrust and torque caused by a movement of the vehicle 102a in a field of the disturbance as a function of the motion parameters.

It is understood that the motion parameters depend on the specific representation of the splines defining the vehicle's motion. In one embodiment, the splines are defined as polynomials in which case the motion parameters are the polynomial coefficients of the splines. In other embodiments, the splines are Bezier curves, in which case the motion parameters are taken as the control points of the splines.

The objective function 103d is used to control the motion of the vehicle 102a, as described below in FIG. 1E.

Figure 1E:
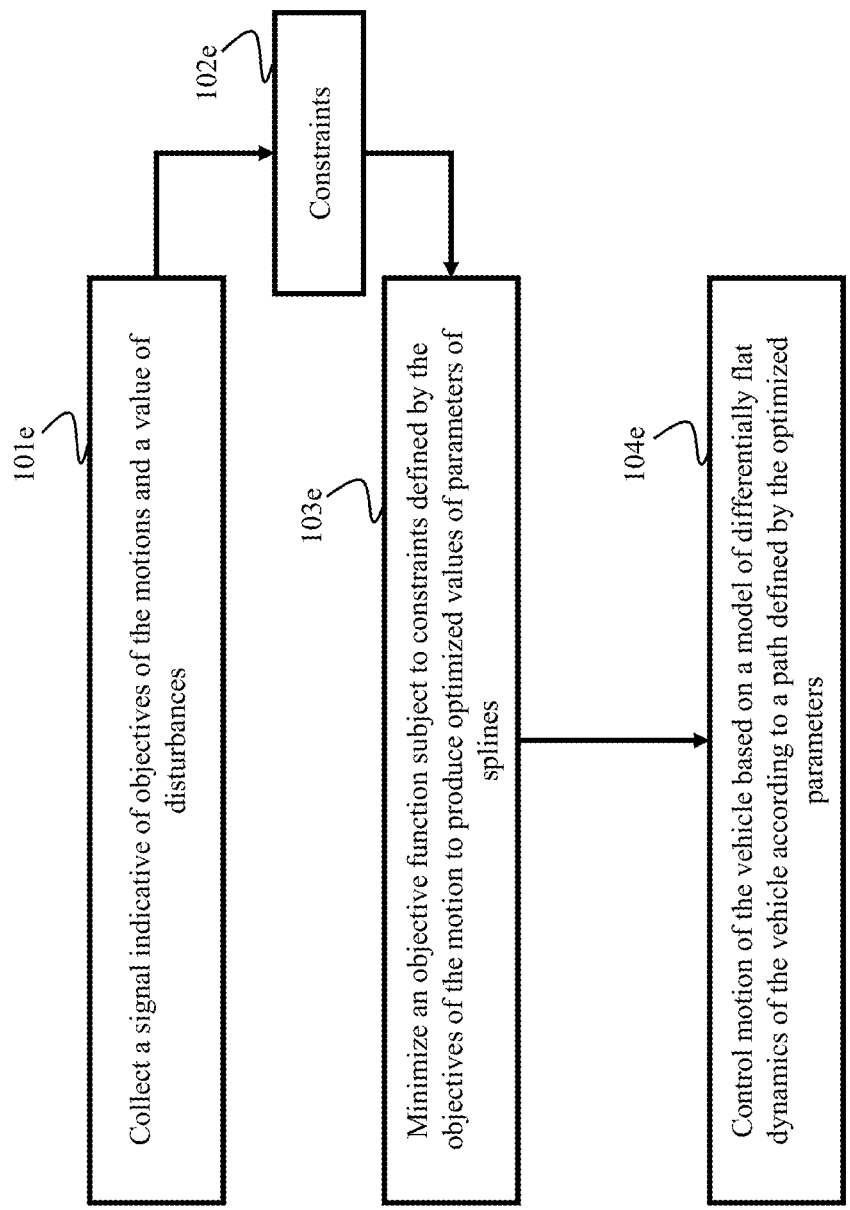
FIG. 1E shows a block diagram for controlling the motion of the vehicle using an objective function, according to some embodiments of the present disclosure.

FIG. 1E shows a block diagram for controlling the motion of the vehicle 102a using the objective function 103d, according to some embodiments of the present disclosure. At block 101e, the processor 101d collects a signal indicative of objectives of the motion and a value of the disturbances. The objectives of the motion may, for example, include waypoints and/or areas for the vehicle 102a to cross. The value of the disturbances, e.g., the wind, may be collected from one or a combination of meteorological forecasts, one or more sensors, Computer Fluid Dynamics (CFD) simulations with boundary conditions and a geometry of the environment 100a in which the vehicle is controlled.

At block 102e, the processor 101d determines constraints based on the objectives of the motion. At block 103e, the processor 101d minimizes the objective function 103d subject to the constraints defined by the objectives of the motion to produce optimized values of the parameters of the sequence of splines. The optimized values of the parameters of the sequence of splines define an optimal path.

At block 104e, the processor 101d controls the motion of the vehicle 102a based on a model of differentially flat dynamics of the vehicle 102a according to the optimal path defined by the optimized parameters. In one embodiment, the dynamics governing the vehicle motion satisfies a property of differential flatness. Differential flatness is a property of a dynamical system (such as the vehicle 102a) described by a set of differential equations that can be expressed as a chain of high-dimensional integrators in a space, called a flat output space, related to an original state space by a linear or a nonlinear transformation. In the present disclosure, the vehicle 102a can be any system that is differentially flat. The differentially flat vehicles operate with flat outputs of varying dimensions. For examples, the quadrotor unmanned aerial vehicle has a four-dimensional flat output space, while a hovercraft has a two-dimensional flat output space.

Further, the formulation of the objective function 103d that is minimized, is described below.

Figure 1F:
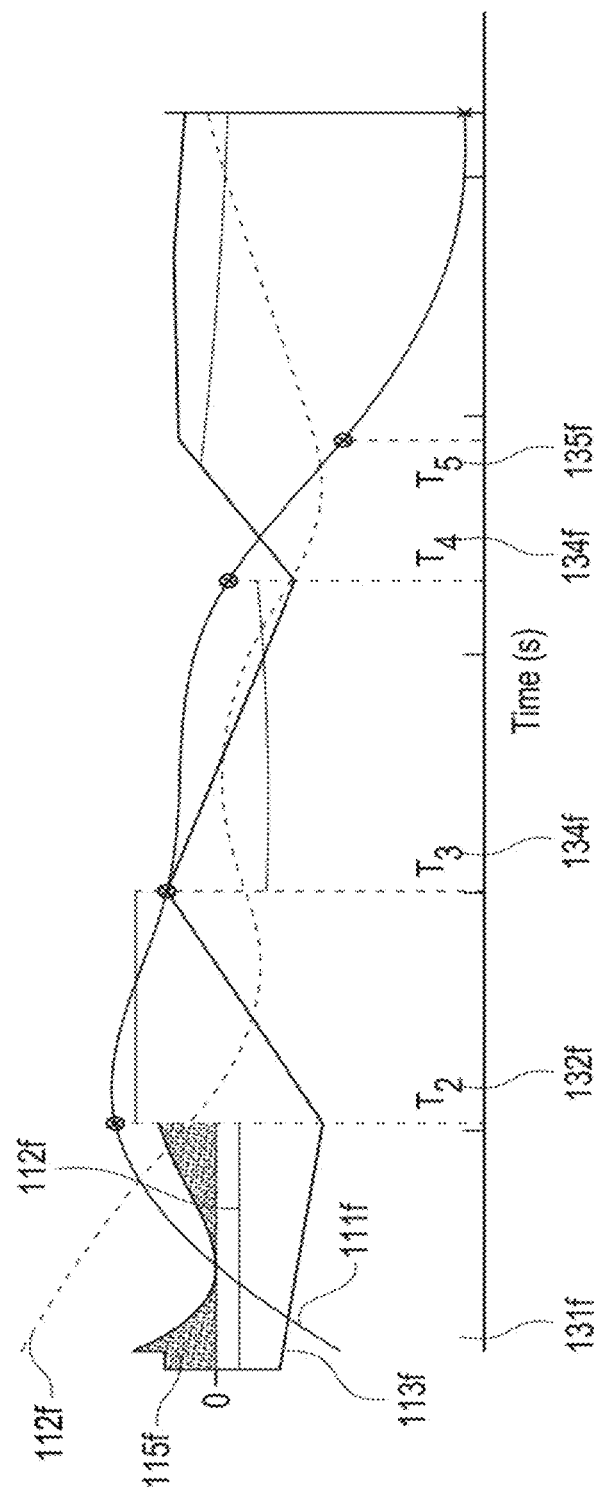
FIG. 1F shows segments of a path/motion plan of the vehicle, according to some embodiments of the present disclosure.

FIG. 1F shows segments of the path/motion plan of the vehicle 102a illustrated in one dimension of the flat output space of the vehicle 102a, according to some embodiments of the present disclosure. the motion of the vehicle is parameterized by the sequence of splines as parameterized curves, and wherein the parametrized curves include one or a combination of polynomials, Bezier curves, B-splines; truncated Fourier series, and Legendre polynomials. It is understood that any other representation of the path that is linear in motion parameters can be used in place of these parametrizations. The path includes m segments, wherein each segment is defined $t \in [0, T_l]^{OBJ} T_l^{OBJ}$ 131f-135f $\tau_0 \leq \ldots \leq \tau_m^{\text{OBJ}}$ and where $T_l = \tau_{l+1} - \tau_l^{\text{OBJ}}$. In FIG. 1F, a flat output trajectory ($0^{th}$ derivative) 111*f* and its first three derivatives: velocity ($1^{st}$ derivative) 112*f*, acceleration (2nd derivative) 113*f* and jerk ($3^{rd}$ derivative) are depicted. The control system 100*d* computes the path in the flat output space and operates with an explicit parameterization of the motion as a set of such segments or splines. With Bezier curves, the lth spline is parametrized in a set of control points $$\mathcal{P}_l = \{p_{li} \in \mathbb{R}^d : d > 1, i \in [0, \ldots, n]\}$$

and the path is defined in a path variable $\lambda \in [0,1]$ as follows $$B(\lambda; \mathcal{P}_l) = \sum_{i=0}^{n} \binom{n}{i}(1-\lambda)^{(n-i)}\lambda^i p_{li}$$

The path variable is related to time by any variable substitution, such as a linear variable substitution $\lambda = tT_i^{-1}$. The objective of the control system 100*d* is then to optimize parameters describing the path, here collected for all splines in a vector, p, and/or times on which the path is defined, collected in a vector T, subject to a cost expressed in p and T, while constraining the path to the sets defining free space depicted in FIG. 1B and FIG. 1C, and other constraints that enforce continuity in the motion at end points of the spline.

In some embodiments, the objective function used in the control system 100*d* is a weighted function of a minimum snap cost, J(p), a thrust cost, C(p), and a time cost relating to a total execution time of the path. In some embodiments, these costs may be expressed in the parameters defining the sequence of splines or in decision variables. For example, with the Bezier curves, if collecting all the control points for all the splines in a large vector, p, the cost J(p) can be expressed in the form $$J(p) = \sum_{i=1}^{m}\sum_{k=0}^{n} c_k \left\| \frac{d^k}{dt^k} B(tT_i^{-1}; \mathcal{P}_i) \right\|_{\mathcal{L}_2([0,T_i])}^2 = p^\top \text{diag}(\bar{Q}_1, \ldots, \bar{Q}_m)p$$

wherein $$\bar{Q}_i = \sum_{k=0}^{n} c_k T_i^{-2k+1}(M_n^k)^\top (Q_{n-k} \otimes I_d) M_n^k$$

$$[Q_n]_{(i+1),(j+1)} = \frac{(n!)^2 \Gamma(j+i+1)\Gamma(2n+1-i-j)}{i!j!(n-i)!(n-j)!\Gamma(2n+2)}$$

$$M_n^1 = n \begin{bmatrix} -I_d & I_d & 0 & \ldots & 0 & 0 \\ 0 & -I_d & I_d & \ldots & 0 & 0 \\ \vdots & \vdots & \ddots & \vdots & \vdots \\ 0 & 0 & 0 & \ldots & I_d & 0 \\ 0 & 0 & 0 & \ldots & -I_d & I_d \end{bmatrix}$$

$$M_n^k = M_{n-k+1}^k \ldots M_{n-1}^1 M_n^1$$

The first term of the objective function with k=0 and i=1 is depicted as shaded area 115*f* in FIG. 1F. As such, the cost J(p) combines such shaded areas for every derivative and every segment in the path to an aggregated cost. Analogously, the minimum snap cost can be expressed in polynomials, Legendre curves, truncated Fourier series, exponential basis function.

It is understood that for a differentially flat vehicle with rotational degrees of freedom actuated by means of generating forces on the vehicle 102*a*, such as UAV or the hovercraft, it is critical to minimally use the actuators of the vehicle 102*a* to conserve fuel. For any such system, in which the forces enter differential equations describing the motion of the vehicle 102*a* additively, either directly or through a projection onto a rotated direction that may or may not be a part of the vehicle's state vector, a squared two-norm of the force can, at any given point in time, be expressed as a function in the same function class as the spline used to describe the motion/path of the vehicle 102*a*. For example, for the UAV, a squared two-norm of the UAV thrust equates to a sum of squared two norms of signals comprised of a sum of accelerations, velocities, and any other external forces applied to the UAV.

$$m\dot{v}(t) = f(t)R(t)e_3 - mge_3 + f_w(t)$$

If the accelerations, the velocities, and any other forcing terms of the UAV can each be described as Bezier curves, then the squared two-norm of an actuating force is sum of squared two norms of Bezier curves. As such, when adopting a linear model for how the UAV interacts with the wind speeds, with a forcing term $$f_w = K(v_w - v) + l$$

A two-norm squared of the thrust cost can be written as $$\|f\|_2^2 = \|m\dot{v} + mge_3 - f_w\|_2^2 = \|\underbrace{m\dot{v} + mge_3 - l + K(v - v_w)}_{\mathcal{U}(t)}\|_2^2$$

Therefore, the present disclosure recognizes that any disturbance parametrized in the same function class as the motion plan (or path plan) can be used in the planning problem to formulate a cost that describes how such a disturbance affects the actuation required during a maneuver. This cost is referred to as the thrust cost, C(p), and is a function of the motion plan, given the disturbance model here with parameters w. In one embodiment, the thrust cost is expressed with respect to a disturbance model with diagonal matrix K, which amounts to a summation over the splines and dimensions, $$C(p) = \|f\|_{\mathcal{L}_2}^2 = \sum_{i=1}^{m} \|\mathcal{U}_i\|_{\mathcal{L}_2}^2 = \sum_{i=1}^{m}\sum_{j=1}^{3} \|\mathcal{U}_i^j\|_{\mathcal{L}_2}^2$$

In some embodiments, it is recognized that curves describing U can be related to curves describing the motion, making it possible to evaluate integrals describing squared $\mathcal{L}_2$-norms analytically. It is further recognized that under certain assumptions on the disturbance model, the cost C(p) remains convex in the decision variables.

Further, it is also recognized that the cost C(p) can be evaluated analytically in its first two moments for certain classes of stochastic disturbance models. Specifically, if parameters of the disturbance model are known in distribution as being Gaussian, then first two moments of the thrust cost C(p) remain convex in the decision variables. As such, some embodiments include costs where either a mean or a variance of the thrust cost, or both are minimized subject to the motion of the vehicle as encoded in the vector p.

In some embodiments, a total time of the maneuver (or total time to execute a path) is also minimized. Some embodiments are based on the recognition that for some parametrizations of the motion permit a sum of the minimum snap cost, the thrust cost, and a convex function of spline times, here denoted Q(p, T), is strictly biconvex. In such embodiments, efficient optimizers can be used to minimize the total cost. In other embodiments, the total cost can be minimized using any non-convex optimizer over p and T, and in other embodiments convexity of the problem in p is leveraged to parametrize an optimal solution p* as a function of T, and instead minimizing q(T)=Q(p*(T), T).

Figure 1G:
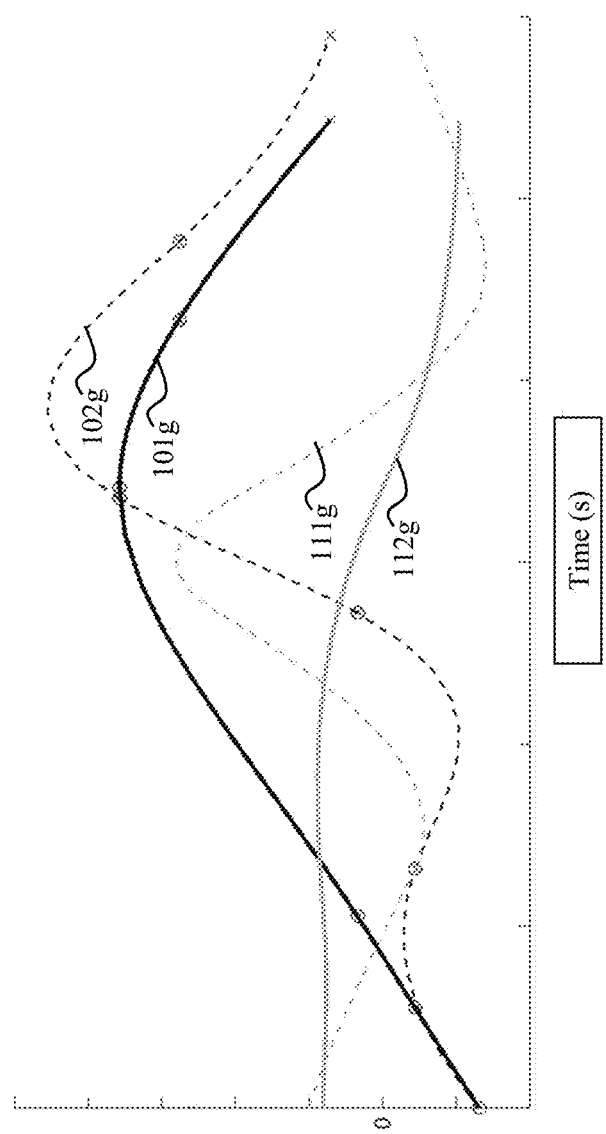
FIG. 1G illustrates a motion plan computation in one dimension using a polynomial parametrization of the motion, with respect to a minimum snap cost, a minimum thrust cost, and a minimum time cost, defined as a function as Q(p, T), according to some embodiments of the present disclosure.

FIG. 1G illustrates a motion plan computation in one dimension using a polynomial parametrization of the motion, with respect to a minimum snap cost, a minimum thrust cost, and a minimum time cost, defined as a function as Q(p, T), according to some embodiments of the present disclosure. Under this parameterization, it is understood that the objective function is not convex in its arguments. It is therefore minimized with respect to an auxiliary objective function q(T) using a non-convex optimizer. Including the segment times, T, in optimization variables in this manner results in a different path $101g$ defined over a shorter time than a path $102g$ that does not include the time cost $102g$. In such cases, velocities $111g$ also becomes more volatile than a path $112g$ that does not include the time cost. Weighting of components of the objective function will affect such a tradeoff.

Figure 1H:
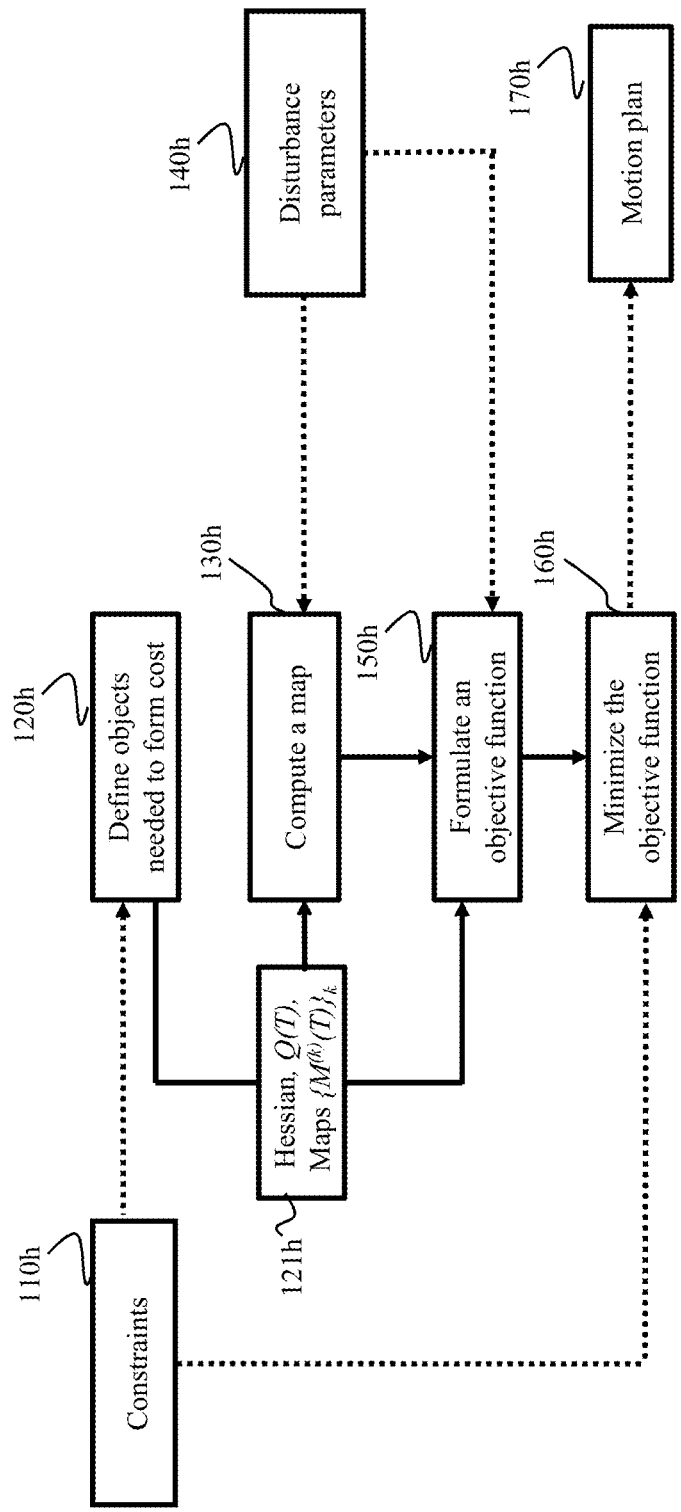
FIG. 1H illustrates formulation and minimization of the objective function, according to some embodiments of the present disclosure.

FIG. 1H illustrates formulation and minimization of the objective function Q(p, T), according to some embodiments of the present disclosure. In one embodiment, based on constraints $110h$, the processor $101d$ defines $120h$ objects need to form the objective function, such as Hessians and maps relating the parameters of derivatives of one spline to original spline parameters $121h$ are computed. Further, based on the Hessians and the maps $121h$, and disturbance parameters $140h$, the processor $101d$ computes $130h$ a map relating the disturbance parameters $140h$ to the parameters of the motion of the vehicle $102a$. Based on the disturbance parameters $140h$ and the computed map, the processor $101d$ formulates $150h$ the objective function. Further, the processor $101d$ minimizes $160h$ the objective function subject to the constraints $110h$, producing a motion plan $170h$ in terms of the decision variables p and T.

The computation of the disturbance parameters $140h$ is explained in detail below with reference to FIG. 2A, FIG. 2B, and FIG. 2C.

Figure 2A:
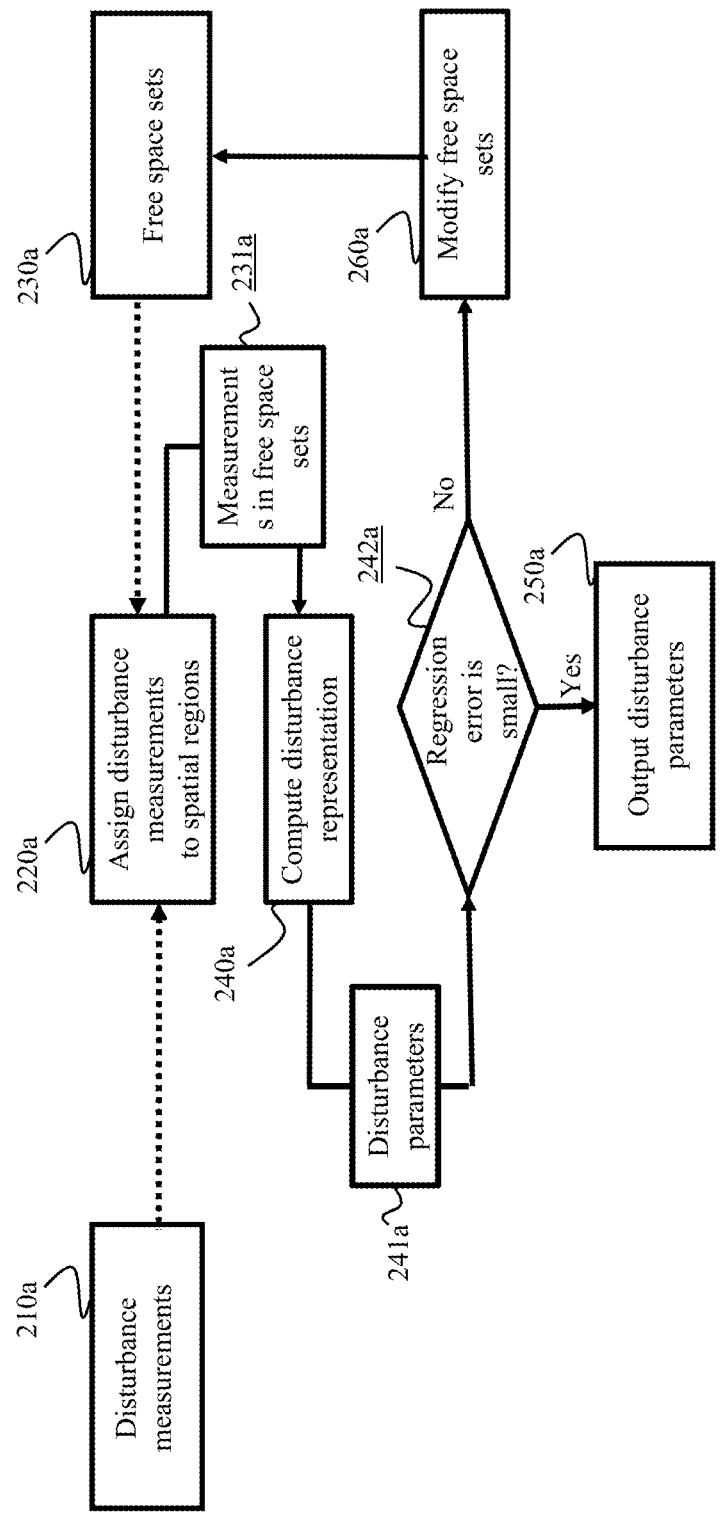
FIG. 2A illustrates computation of disturbance parameters from disturbance measurements, according to some embodiments of the present disclosure.

FIG. 2A illustrates computation of disturbance parameters $250a$ from disturbance measurements $210a$, according to some embodiments of the present disclosure. The disturbance measurements $210a$ here permit the sampling of disturbance information in space and time over a planning horizon, and may be generated from real-time estimates and prediction, simulators, or other forecasts. For example, in context of the aerial vehicle, the wind may be predicted forward in time from real-time estimates of the wind generated by on-board sensing with one or multiple vehicles or using an external sensor such as a LiDAR with appropriate wind reconstruction algorithms. The disturbance measurements $210a$ may also be generated by CFD simulations assuming a known boundary condition or inferred from meteorological forecasts of varying fidelity.

In one embodiment, the disturbance measurements $210a$ are converted into a representation in which samples are assigned $220a$ to spatial regions referred to as free space sets $230a$ in which the disturbance is taken to be homogeneous in space, but not necessarily time. With the assigned samples or measurements $231a$, a disturbance representation is computed $240a$. The computation of the disturbance representation is carried out using a regression over a parametric curve expressed in time of the same function class as the motion of the vehicle $102a$. In such an embodiment, both mean and covariance of disturbance parameters $241a$ can be computed. Additionally, in some embodiments, given the disturbance measurements $210a$, a regression error $242a$ may be computed and used to modify $260a$ the free space sets, if the regression error is large. If the regression error $242a$ is sufficiently small, the disturbance parameters $241a$ are outputted $250a$.

Further, in some embodiments, new measurements of the disturbances are collected and the disturbance parameters $241a$ are updated based on the new measurements of the disturbances. It is understood that different vehicles will be affected by diverse kinds of disturbances. For example, the aerial vehicle may be affected by the wind, a surface vessel may be affected by both the wind and water currents, an underwater vehicle may be affected by underwater currents, and a motor may be affected by viscous friction. All these disturbances can be modeled as single- or multi-variate vector fields depending on the vehicle. In tone example concerning the aerial vehicle, the disturbance may be being a wind speed vector field that is sensed in real time. The measurements of the disturbance are collectively referred to as disturbance models in the following.

Figure 2B:
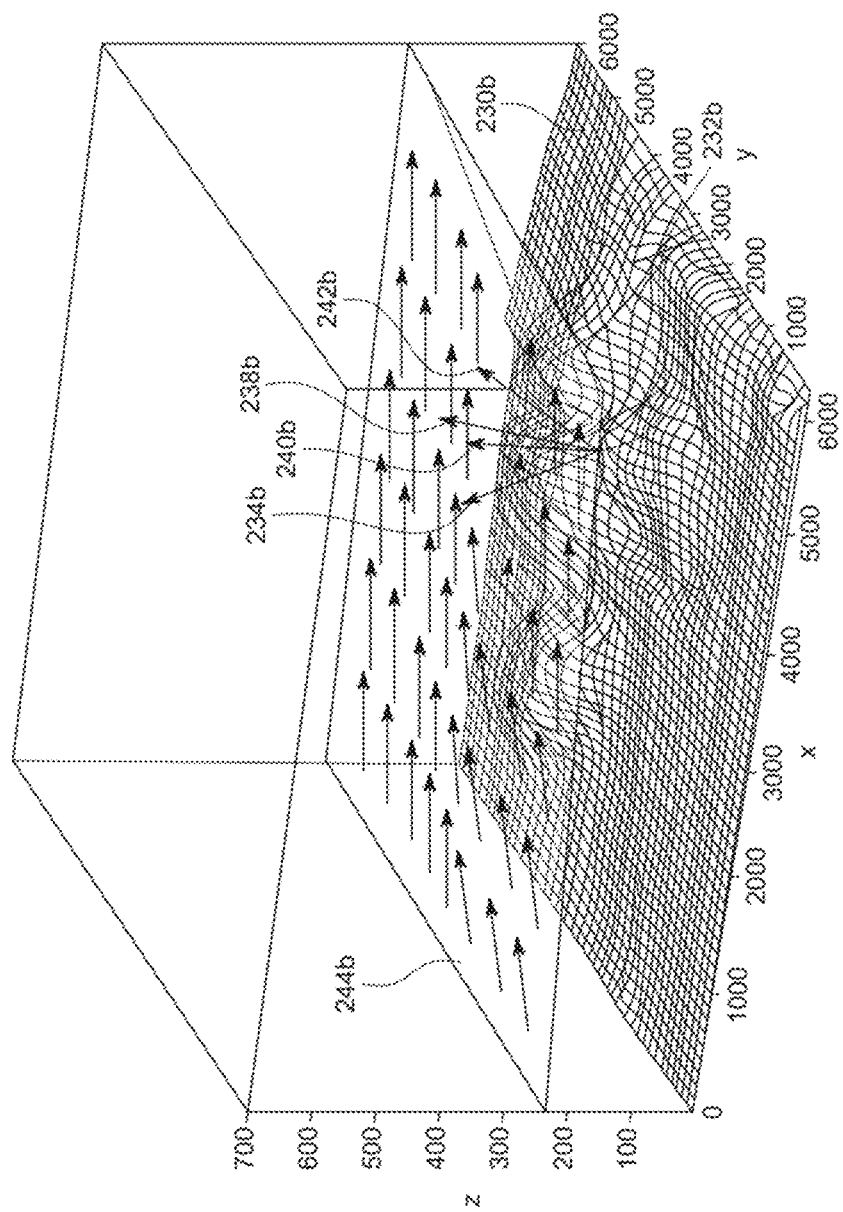
FIG. 2B shows a schematic of a remote sensing of the wind over a complex terrain, according to some embodiments of the present disclosure.

FIG. 2B shows a schematic of a remote sensing of the wind over a complex terrain $230b$, according to some embodiments of the present disclosure. A LiDAR sensor $232b$ arranged at a point, e.g., at a top of a hill, performs series of line-of-sight measurements on a cone including measurements $234b$, $238b$, $242b$ along a surface of the cone, and measurements along a center line $240b$. The measurements are taken for different altitudes corresponding to different planes. In such a manner, for a set of altitudes corresponding to planes $244b$, the measurements on the cone are measurements on a circle including multiple measurements of radial velocities in different angular directions measured at different line-of-site points on a circumference of the circle and one measurement of the radial velocity in a vertical direction measured at a center of the circle.

Additionally, such sensors aim to determine a horizontal velocity of the wind for each altitude. Given the measurements, an estimate of the horizontal velocity can be determined from the measurements of the radial velocity using a geometrical relationship and assuming that wind velocity is homogenous on each plane. In one embodiment, the estimated velocity of the wind is based on homogenous assumption. Some LiDAR sensors are based on recognition that, for complex terrains, such as the terrain $230b$, the homogenous velocity assumption leads to a bias in LiDAR estimation of the horizontal velocity. A main error is due to variation of a vertical velocity, e.g., along a hill. To that end, some embodiments are based on realization that the homogeneous velocity assumption in sensing wind flow passing over the complex terrain can be corrected using a horizontal derivative of the vertical velocity.

An output of the LiDAR sensor $232b$ is therefore a set of 2D wind vector fields $244b$, which can be extrapolated to a 3D vector field by including multiple planes $244b$. From a disturbance model that predicts the velocities in time, samples on wind speed can be collected in each set of the free space sets as a function of time and permitting a curve to be fitted to the disturbance model. Importantly, the curve must be in the same function class as that used to parametrize the motion of the vehicle. For instance, if a motion model is parametrized as a collection of Bezier curves, then the regression of the disturbance model needs to be executed over a set of Bezier curves. This is illustrated in FIG. 2C, where a disturbance model is sampled in time and visualized in three-dimensional space as a set of N points 230c. In this example, the curve is confined to a subset of the free space of a vehicle operating in three-dimensional space, such as the sets 111b-119b, and a true wind model 220c is known. From these N samples, a wind disturbance model 210c is determined as a Bezier curve parametrized in time, which closely resembles the true wind model 220c. Here, such a regression is simple to implement and executed in terms of a measure of total squared total variation error of the regressed wind model with respect to the sampled points 230c, $$TV(p) = \|B(\lambda; \mathcal{P}) - d(\lambda)\|^2_{\mathcal{L}_2([0,1])}$$

which can be approximated as $$TV(p) \approx \sum_{i=1}^{N}((\alpha(\lambda) \otimes I_d)p - d_i)^\top (\Delta_i I_d)((\alpha(\lambda) \otimes I_d)p - d_i) = p^\top H p + f^\top p + c$$

$$\Delta_i = \begin{cases} \lambda_{i+1} - \lambda_i & \text{if } i = 1 \\ \lambda_i - \lambda_{i-1} & \text{if } i = N \\ \frac{1}{2}(\lambda_{i+1} - \lambda_{i-1}) & \text{otherwise} \end{cases}$$

Such an objective function can be solved analytically without inequality constraints by inverting a linear system. As an example, but without loss of generality, for a Bezier curve in d-dimensional space, $$H \triangleq A^\top NA, \quad f \triangleq -2A^\top ND, \quad c \triangleq D^\top ND$$

$$N = \mathrm{diag}(\Delta_1, \ldots, \Delta_N) \otimes I_d, \quad A = \begin{bmatrix} \alpha(\lambda_1) \\ \vdots \\ \alpha(\lambda_N) \end{bmatrix} \otimes I_d, \quad D = \begin{bmatrix} d_1 \\ \vdots \\ d_N \end{bmatrix}$$

with a solution $$\hat{p} = \mathrm{argmin}_p\, TV(p) = (A^\top NA)^{-1} A^\top ND$$

Figure 2C:
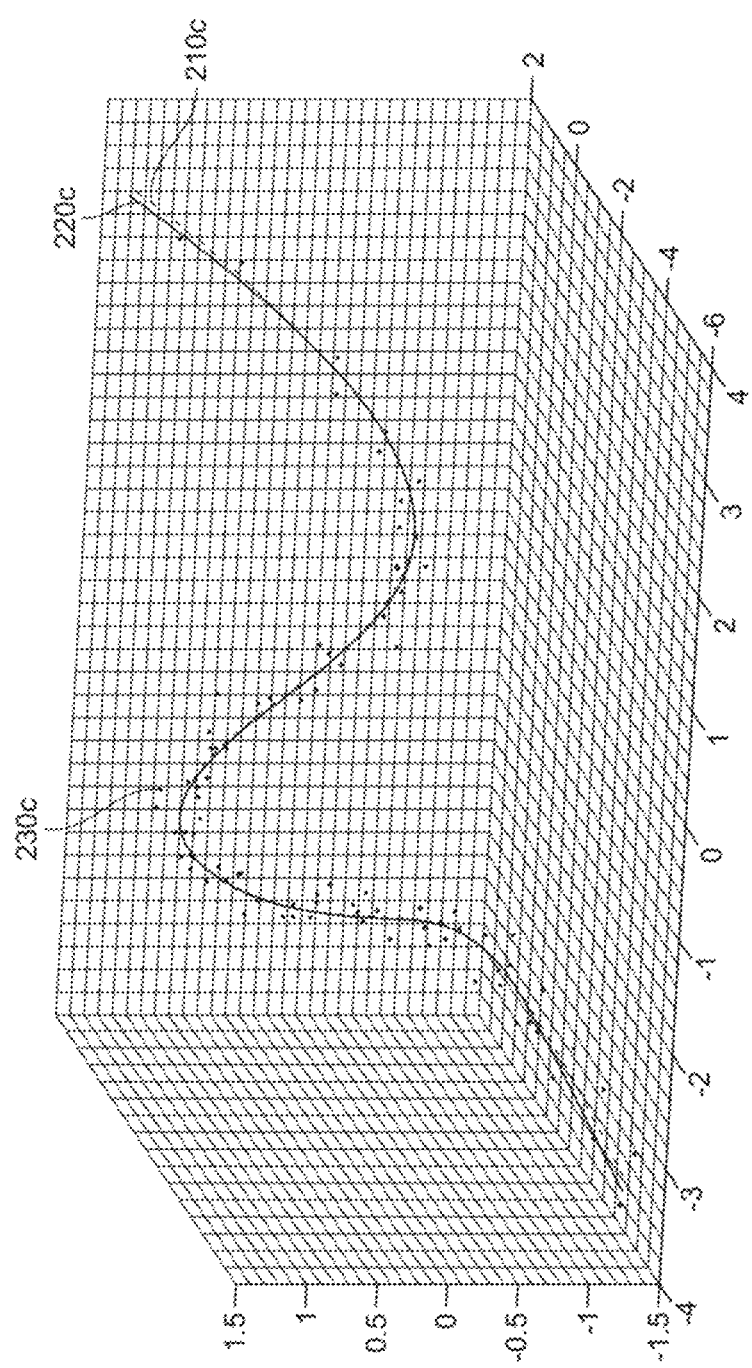
FIG. 2C shows a regression of a disturbance model represented by a function in the same class as that used to parametrize the motion of the vehicle, according to some embodiments of the present disclosure.

This solution is illustrated in FIG. 2C, and an important feature of such a regression is that any uncertainty in the wind disturbance model encoded as Gaussian noise on the sampled measurement from the wind disturbance model can be propagated directly to an uncertainty in the parameters of the splines. Without loss of generality, using the Bezier curve merely as an example, the following expression can be obtained for a covariance matrix of spline coefficients $$\mathrm{Cov}\,[\hat{p}] = (2H)^{-1} ANN^\top A^\top (2H)^{-\top} \sigma^2$$

In some embodiments, both mean and the variance of parameters of the disturbance model are included in the objective function used to compute and optimize the parameters of the splines. Such a regression for the disturbance model parameters generalizes to other parametrizations of the motion of the vehicle, and other vector fields governing the disturbance.

Constraint Generation and Segmentation

Figure 3A:
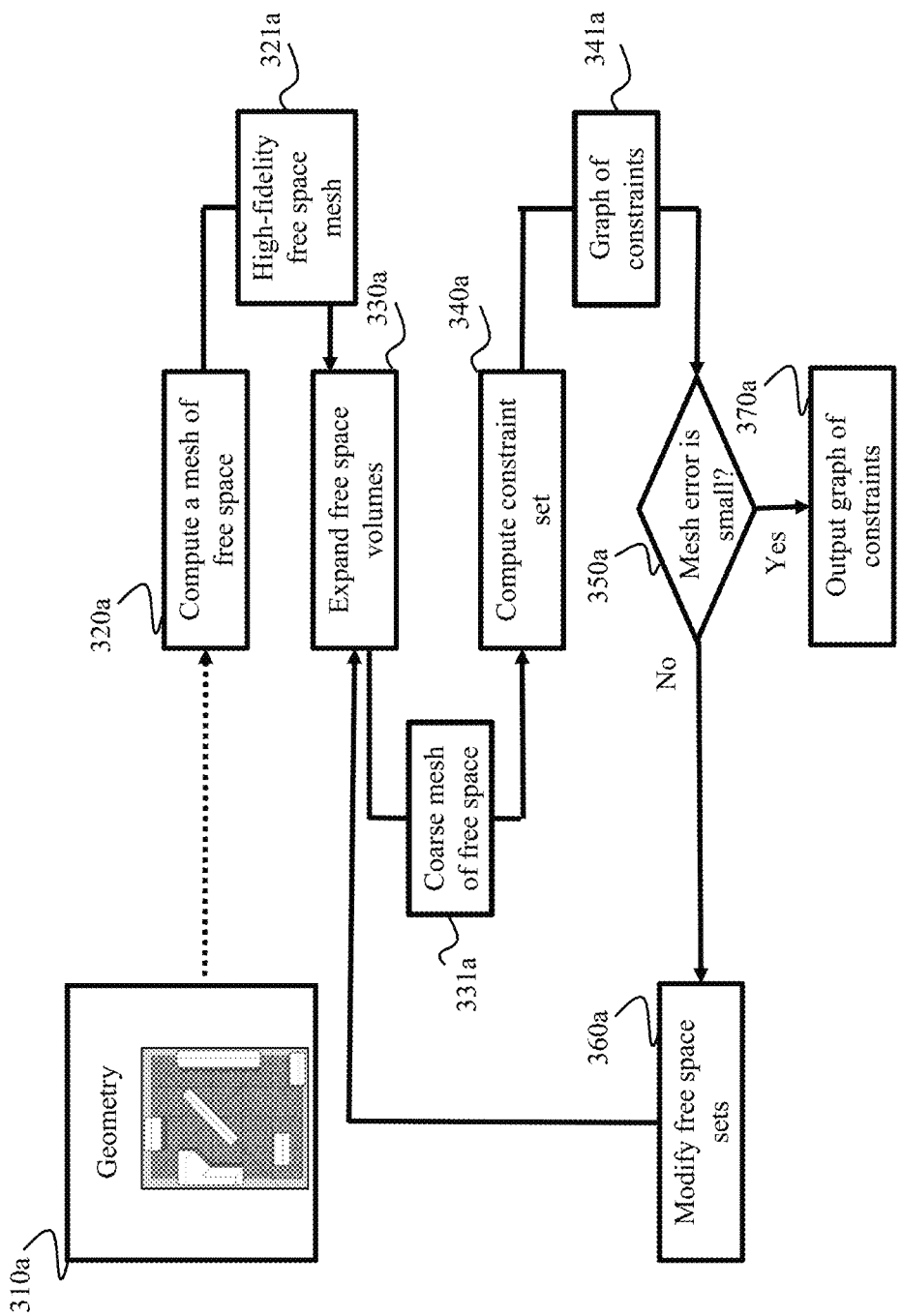
FIG. 3A illustrates computation of constraints and free space sets, according to some embodiments of the present disclosure.

FIG. 3A illustrates computation of the constraints 110h and the free space sets 230a, according to some embodiments of the present disclosure. Geometry 310a of an environment is provided as a set of geometric shapes contained in standard file formats in Computer-Aided Design (CAD), such as the COLLADA or STL formats. Based on the geometry 310a, the processor 101d computes 320a a mesh using any meshing algorithm, resulting in a high-fidelity free-space mesh 321a. The high-fidelity free-space mesh 321a is subsequently expanded 330a into larger sets, by the processor 101d, using submodular optimization and/or greedy combination heuristics. The coarse mesh 331a is referred to as free-space sets, depicted as shaded regions with thick black lines in FIG. 1B. The coarse mesh 331a can be characterized by a set of points and edges, or some other parametric representation. Next, such a representation of the coarse mesh 331a is used compute 340a a constraint set (i.e., the constraints 110), specifying mixed inequality and equality constraints on a configuration in the free space. In some embodiments, a union of the constraint set 340a defines the free space and forms a graph of constraints 341a, in which elements are constraint sets, and edges indicate that two sets are intersecting. Such a graph of constraints 341a is a convenient way of representing the constraint set and can be used in formulation of optimization problems.

It is understood that several factors determine quality of the free space sets, such as a relative volume or area of the largest and smallest region of free space, and how well the disturbance is represented by the disturbance model within each of these sets. To that end, some embodiments define a meshing error, including but not limited to orthogonality of mesh elements, the sharpest angles of the mesh elements, relative volumes of the mesh elements, and the regression error when fitting disturbance parameters to the disturbance model within a given mesh element. The processor 101d checks 350a if the mesh error 342a is small. If the mesh error is large, then free space sets are modified 360a. If the mesh error is sufficiently small, the graph of constraints 341a is outputted 370a.

According to some embodiments, different parametrizations of the motion may require different sets of constraints. For instance, when using the Bezier curve parameterization, safety of the motion plan can be ensured by confining all the control points of a spline segment to a set in the free space. This ensures that the spline, regardless of when it is evaluated, resides within the free space set, as illustrated in FIG. 1C, where a set of five splines 121c, 122c, 123c, 124c, and 125c are optimized over five consecutively intersecting free space sets 111c, 112c, 113c, 114c, and 115c. For other parameterizations of the motion, such as polynomials, the path is confined to consecutive intersections of the free space sets, as illustrated in FIG. 3B.

Figure 3B:
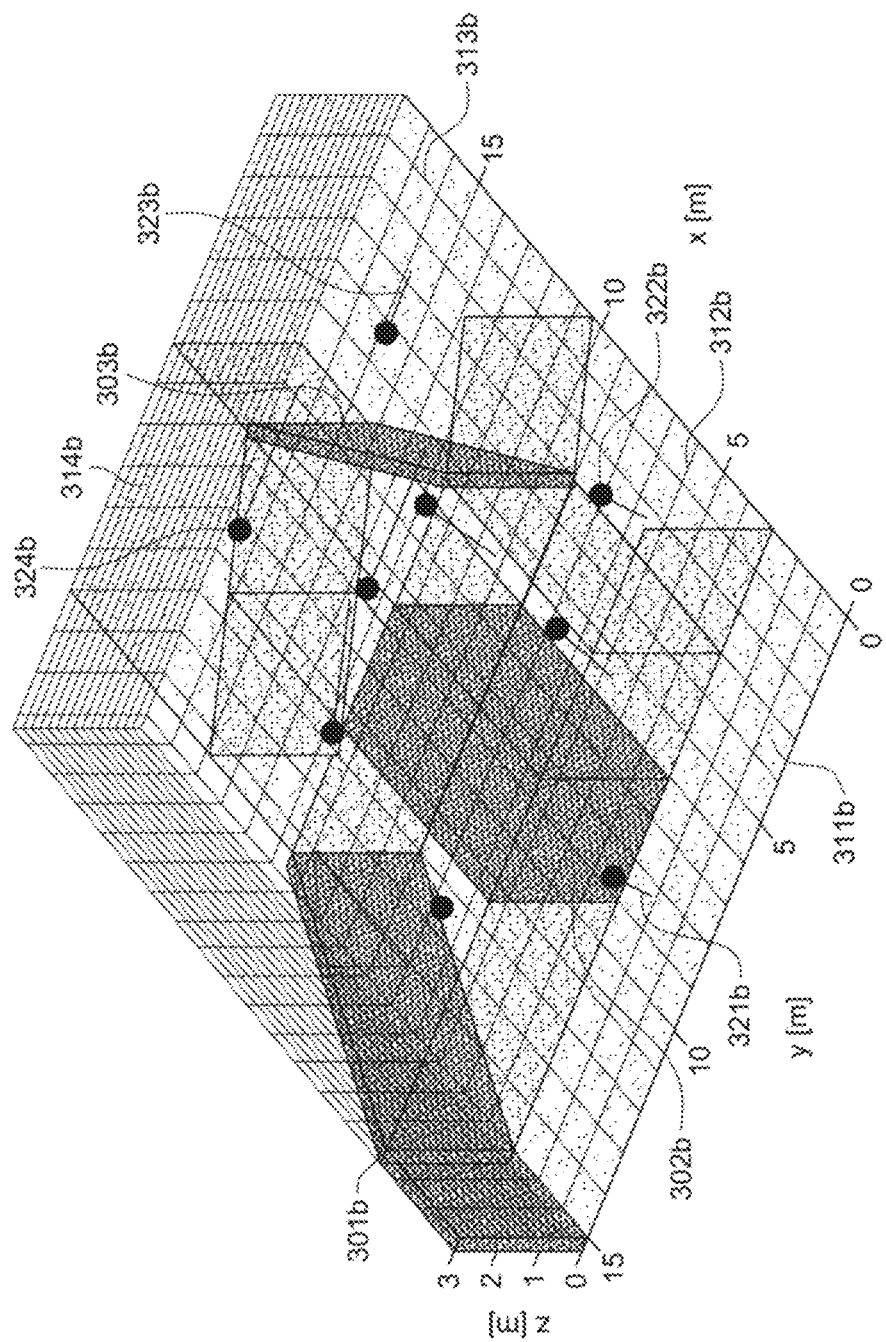
FIG. 3B illustrates a complex environment decomposed into coarse polytopic sets, which define a free space of the vehicle, according to some embodiments of the present disclosure.

FIG. 3B illustrates a complex environment decomposed into a coarse free-space set comprising of sets 311b, 312b, 313b, and 314b, which define the free space of the vehicle 102a and form vertices of the constraint graph 341a. The sets 311b, 312b, 313b, and 314b are determined from a geometry comprising of three obstacles 301b, 302b, 303b. In the depicted embodiment, the sets 311b, 312b, 313b, and 314b are convex and include an illustration of an average wind speed in each set at a specific point in time 321b, 322b, 323b, 324b. The wind speeds act as a disturbance on the vehicle 102a and constitutes the disturbance model in this embodiment.

Figure 3C:
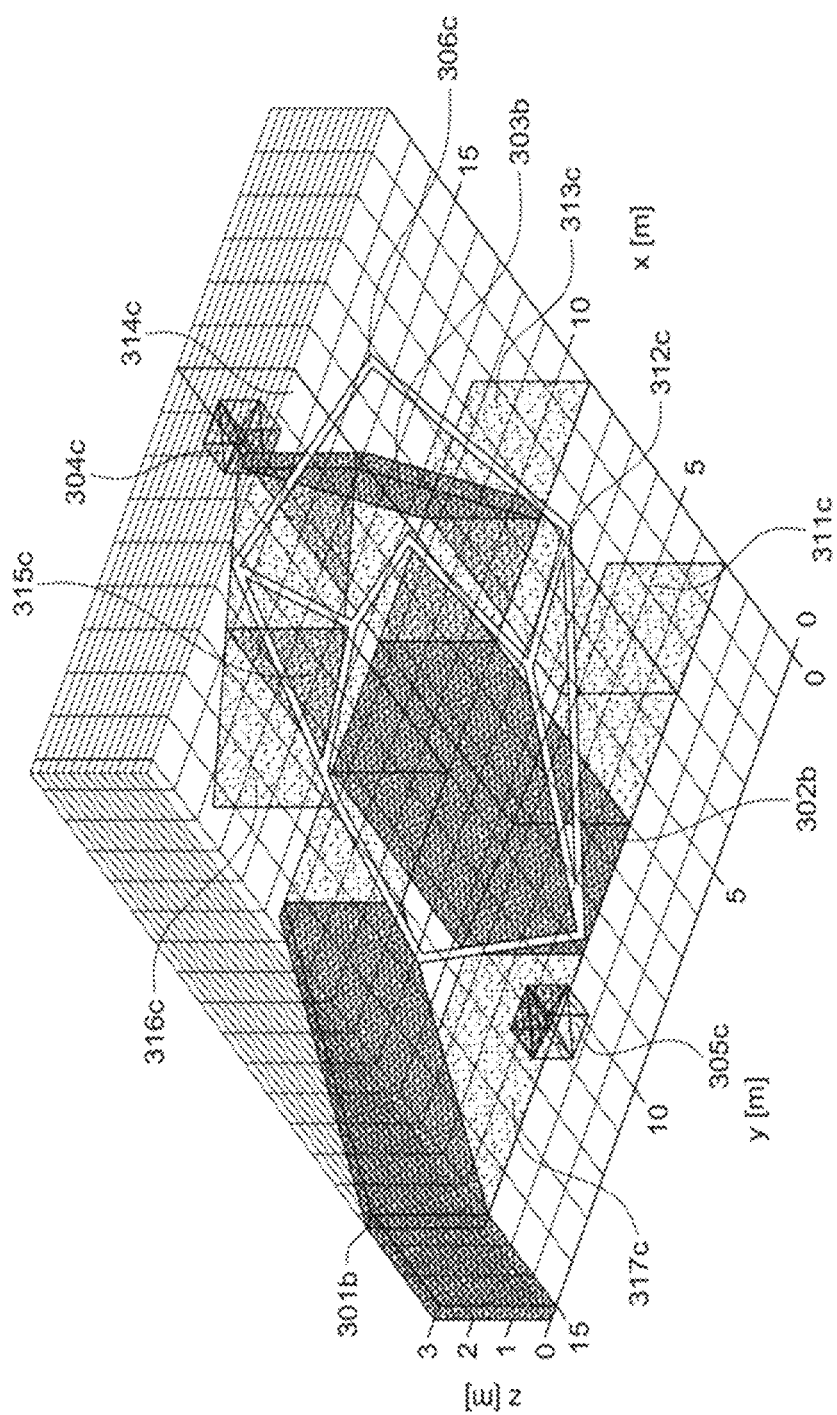
FIG. 3C shows intersections of the sets defining the free space and shows ways of traversing it as edges along a graph, according to some embodiments of the present disclosure.

FIG. 3C shows intersections of the sets defining the free space and shows ways of traversing it as edges along a graph, according to some embodiments of the present disclosure. In the constraint graph, the free space sets with a non-empty intersection forms an edge. These edges are more numerous than the constraint graph's vertices and shown as surfaces 311c, 312c, 313c, 314c, 315c, 316c, and 317c. This permits the vehicle's motion to be constrained to a start region 304c located within one vertex of the constraint graph and plan a path along the edges of the constraint graph to another vertex including a terminal region 305c. A traversal along the constraint graph implies that consecutive splines be constrained to the associated sets on the edges and or vertices of the constraint graph along the designated path. The constraint graph of the free space set connectivity is illustrated from Chebyshev centers of each of the constraint sets.

In some embodiments involving polynomial representations of the motion, endpoints of consecutive splines are constrained to the edges associated with the consecutive edges connecting a start vertex containing the start region 304c with a terminal vertex containing the terminal region 305c over the constraint graph 306c. In other embodiments involving Bezier curves, the control points of the splines are instead constrained to reside within the vertices of the constraint graph, which in addition to guaranteeing that the splines intersect the sets associated with the edges in the constraint graph also guarantees that the path resides in the free space sets associated with the vertices along the designated path. It is understood that the constraints may be formed and applied without explicitly creating the constraint graph, it included as abstract representation to describe ways in which the paths of various splines may be constrained.

Additionally, to ensure that the motion is continuous as a function of time when switching between the splines, some embodiments enforce continuity constraints at endpoints of each pair of consecutive splines. It is understood that initial and terminal endpoints of a spline that is linear in the motion parameters can be expressed as a linear equality constraint. In context of the Bezier curves with an associated spline time T, this can be expressed using the modified maps $$M_n^1(T_i) = \frac{n}{T}\begin{bmatrix} -I_d & I_d & 0 & \ldots & 0 & 0 \\ 0 & -I_d & I_d & \ldots & 0 & 0 \\ \vdots & \vdots & \ddots & \vdots & \vdots \\ 0 & 0 & 0 & \ldots & I_d & 0 \\ 0 & 0 & 0 & \ldots & -I_d & I_d \end{bmatrix}$$

$$M_n^k(T_i) = M_{n-k+1}^1(T_i) \ldots M_{n-1}^1(T_i) M_n^1(T_i)$$

like those defined previously, where if the spline is to be continuous in the kth derivative at an endpoint connecting the spline with index i with parameters $p_i$ and the spline with index i+1 with parameters $p_{i+1}$, then an equality constraint $$0 = \begin{bmatrix} [0, I_d]M_n^k(T_i) & [I_d, 0]M_n^k(T_{i+1}) \end{bmatrix} \begin{bmatrix} p_{i+1} \\ p_i \end{bmatrix}$$

ensures spline continuity in the kth derivative. In some embodiments, such constraints are enforced in all derivatives up until a maximum derivative.

Figure 3D:
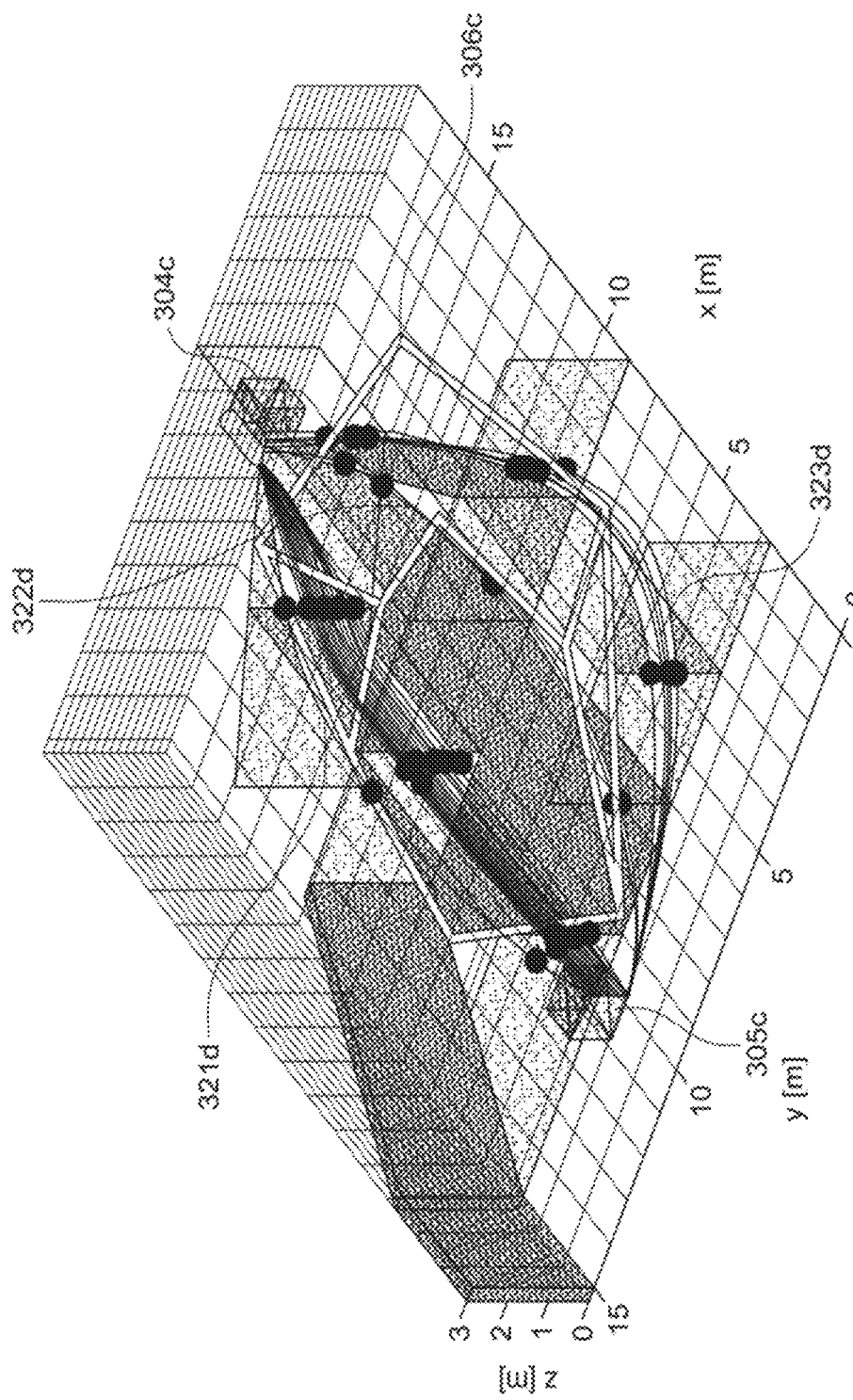
FIG. 3D illustrates a solution of a motion planning problem as computed with a polynomial parametrization of the motion of the vehicle, according to some embodiments of the present disclosure.

FIG. 3D illustrates a solution of a motion planning problem as computed with the polynomial parametrization of the motion of the vehicle 102a, according to some embodiments of the present disclosure. Here, for 100 different wind disturbance models, the solutions take different paths in the free space to minimize the total thrust and higher order derivatives of the motion. Some motion plans 321d take an upper corridor while other motion plans 322d take a center corridor and yet other motion plans 323d take a bottom corridor.

Figure 3E:
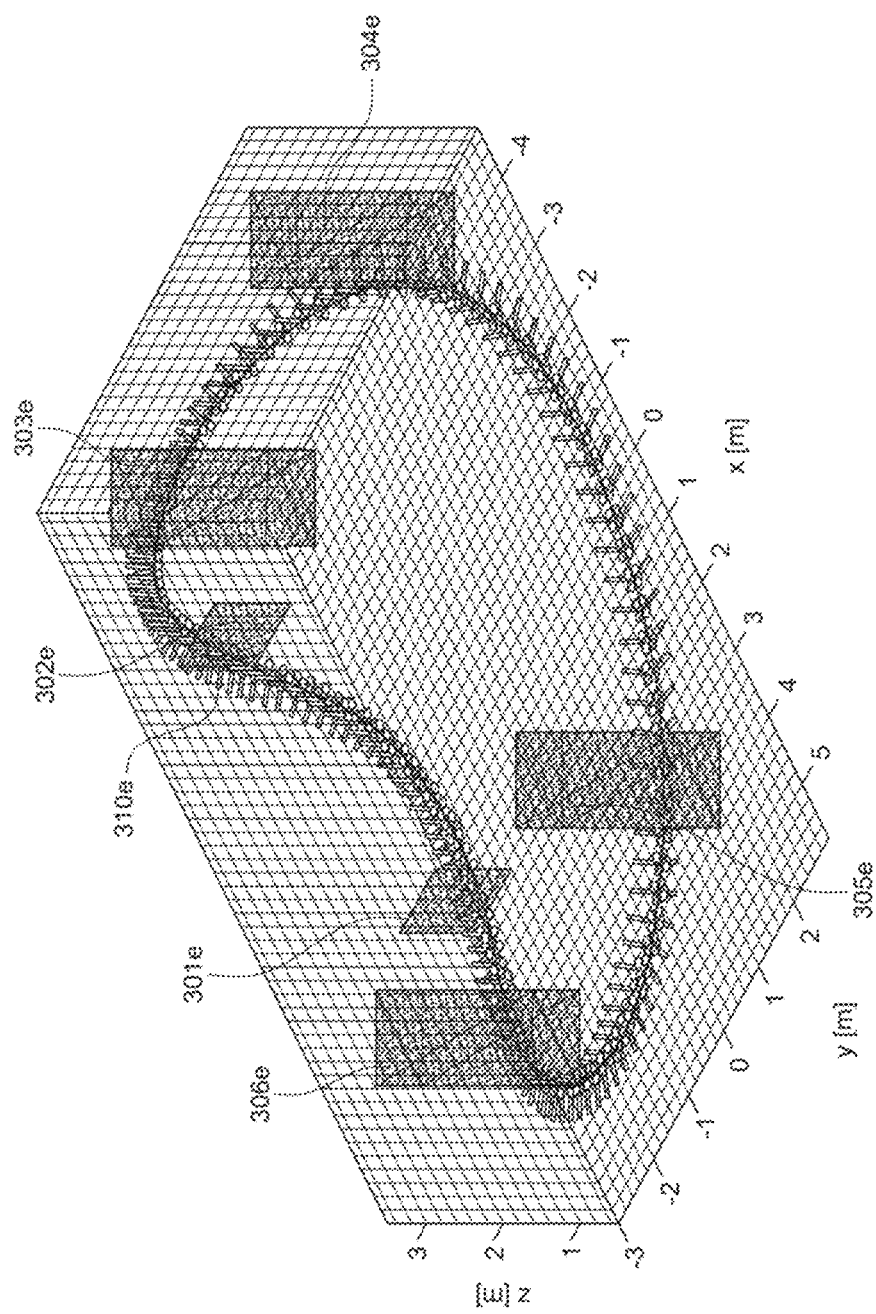
FIG. 3E illustrates a motion plan determined by a sequence of generalized way points through which the path passes, according to some embodiments of the present disclosure.

FIG. 3E illustrates a motion plan determined by a sequence of generalized way points 301e, 302e, 303e, 304e, 305e, and 306e through which the path should pass, according to some embodiments of the present disclosure. The way points 301e-306e can be points, lines, planes 301e, 302e; volumes 303e, 304e, 305e, 306e, or any combination thereof. The vehicle's motion and its configurations form a continuous periodic motion with no start or end point, demonstrating yet another way in which continuity constraints can be embodied and enforced within the scope of the present disclosure.

Figure 4:
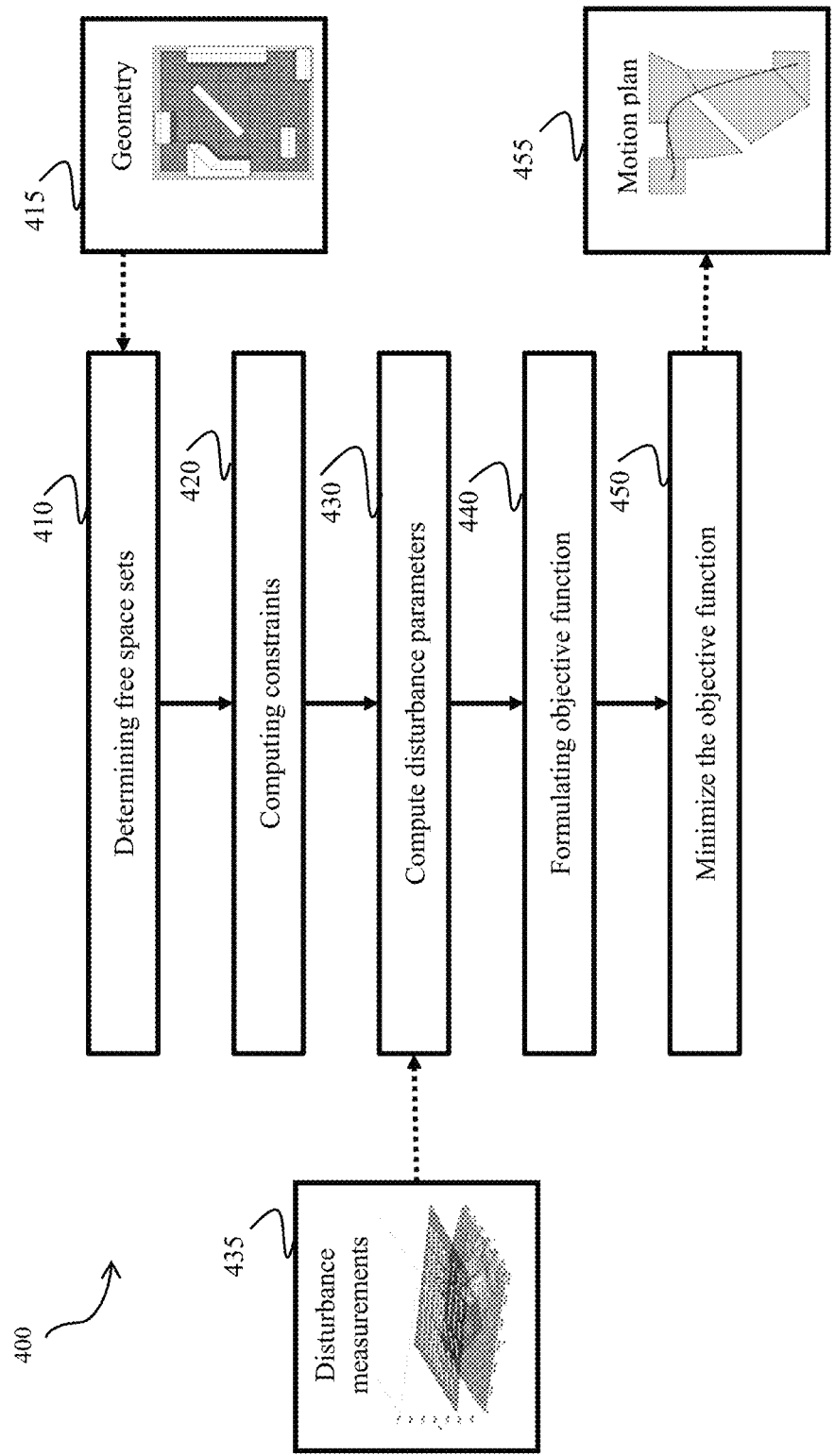
FIG. 4 shows a block diagram of an overall method for determining a motion plan/path for the vehicle in the environment, according to some embodiments of the present disclosure.

FIG. 4 shows a block diagram of an overall method 400 for determining a motion plan/path for the vehicle 102a in an environment, according to some embodiments of the present disclosure. At block 410, the method 400 includes determining free space sets based on a geometry 415 of the environment. At block 420, the method 400 includes computing constraints on the optimization variables, the parameters of the motion plan, defined with any of the prior mentioned spline representations. The computed constraints are represented as equality or inequality constraints on the optimization variables, and are convex in some embodiments, and non-convex in others.

At block 430, the method 400 includes computing, based on disturbance measurements 435, disturbance parameters by parametrizing a disturbance model of the disturbance of the same function class as that used to describe the vehicle's motion. At block 440, the method 400 includes formulating an objective function based on the disturbance parameters. At block 450, the method 400 includes minimizing the objective function subject to the computed constraints to output parameters of a motion plan 455. In some embodiments, the output parameters are the parameters of the splines in the flat output space.

Some embodiments are based on the realization that computation power may be limited in production grade control units (e.g., control system 100d) used in practice, and, thus, some of steps of the method 400 may be executed on a separate server.

Figure 5A:
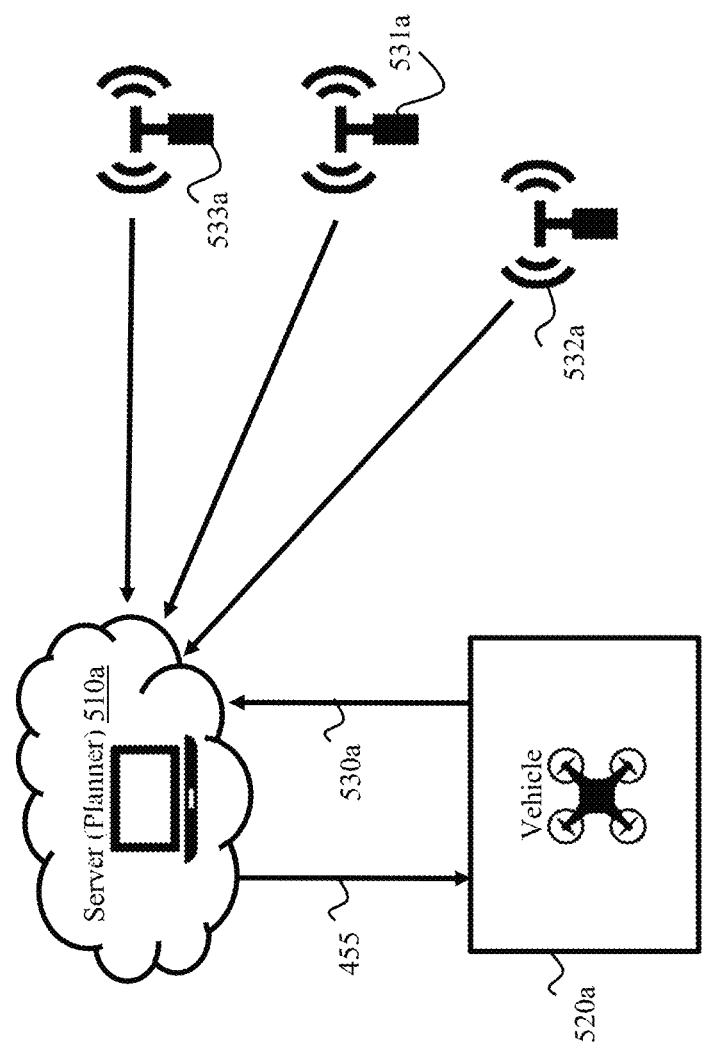
FIG. 5A illustrates an embodiment where steps of the method are implemented on a server, according to some embodiments of the present disclosure.

FIG. 5A illustrates an embodiment where the steps of the method 400 are implemented on a server 510a, according to some embodiments of the present disclosure. The server 510a executes the steps of the method 400 described in FIG. 4 and transmits the motion plan 455 to a vehicle 520a. The vehicle 520a executes the motion plan 455. The vehicle 520a may transmit data 530a of its own state and/or environmental data back to the server 510a. In some embodiments, the motion plan 455 is updated continuously as additional information is gathered on the disturbance and the environment. The information on the disturbance and the environment may be gathered by the vehicle 520*a* itself, or by any third-party sensors 531*a*, 532*a*, 533*a*. The sensors 531*a*, 532*a*, 533*a* may be physical sensors, such as a LiDAR measuring wind speeds, or non-physical sensors, such as meteorological forecasts of the wind speeds or ocean currents, depending on the vehicle 520*a* considered.

Figure 5B:
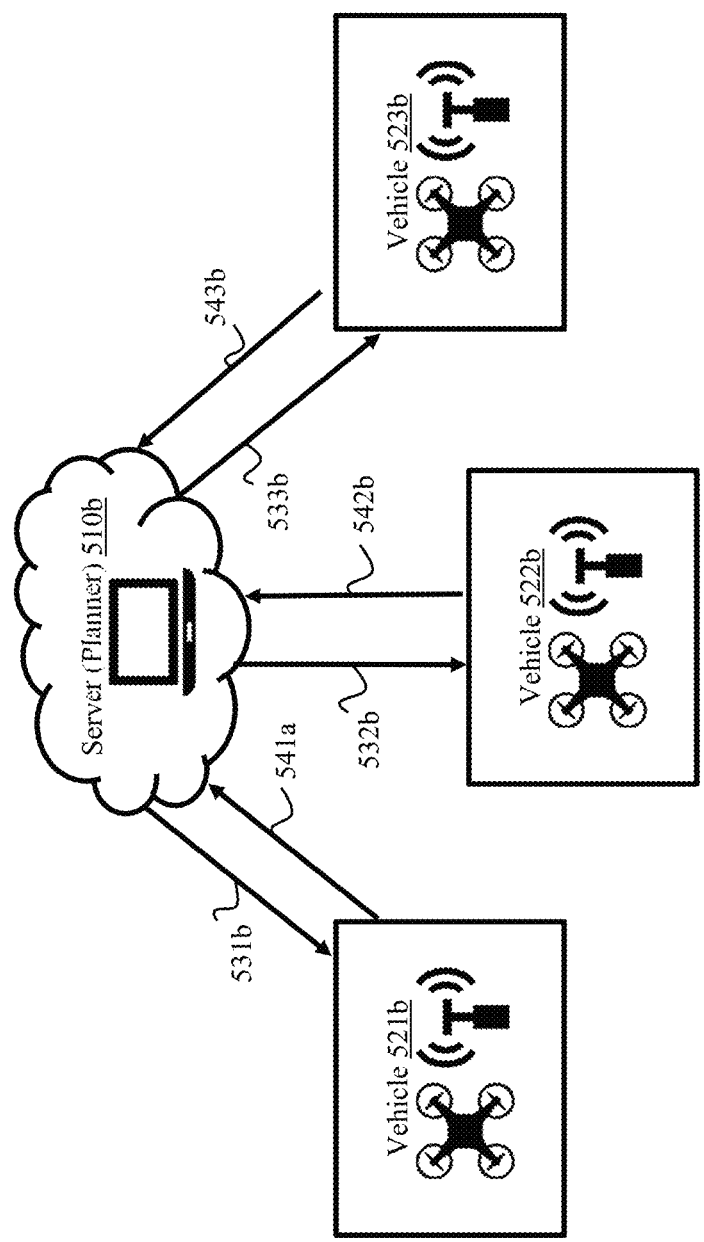
FIG. 5B illustrates another embodiment where the steps of the method are implemented on the server, according to some embodiments of the present disclosure.

FIG. 5B illustrates another embodiment where the steps of the method 400 are implemented on a server 510*b*, according to some embodiments of the present disclosure. The communication is the same as in FIG. 5A, i.e., motion plans 531*b*, 532*b*, and 533*c* are transmitted to vehicles 521*b*, 522*b*, and 523*b*, respectively. In contrast to the embodiment described in FIG. 5A, the vehicles 521*b*, 522*b*, and 523*b* include sensory equipment (onboard sensors) whereby the disturbance can be measured. As such, communications 541*b*, 542*b*, and 543*b* to the server 510*b* include measurements on the disturbance. In this embodiment, there is no need for any additional external sensing, but some embodiments combine the external sensors 531*a*, 532*a*, 533*a* with the onboard sensing. In other embodiments, the server 510*b* is run physically on the vehicle as a component of its larger control system.

Figure 6:
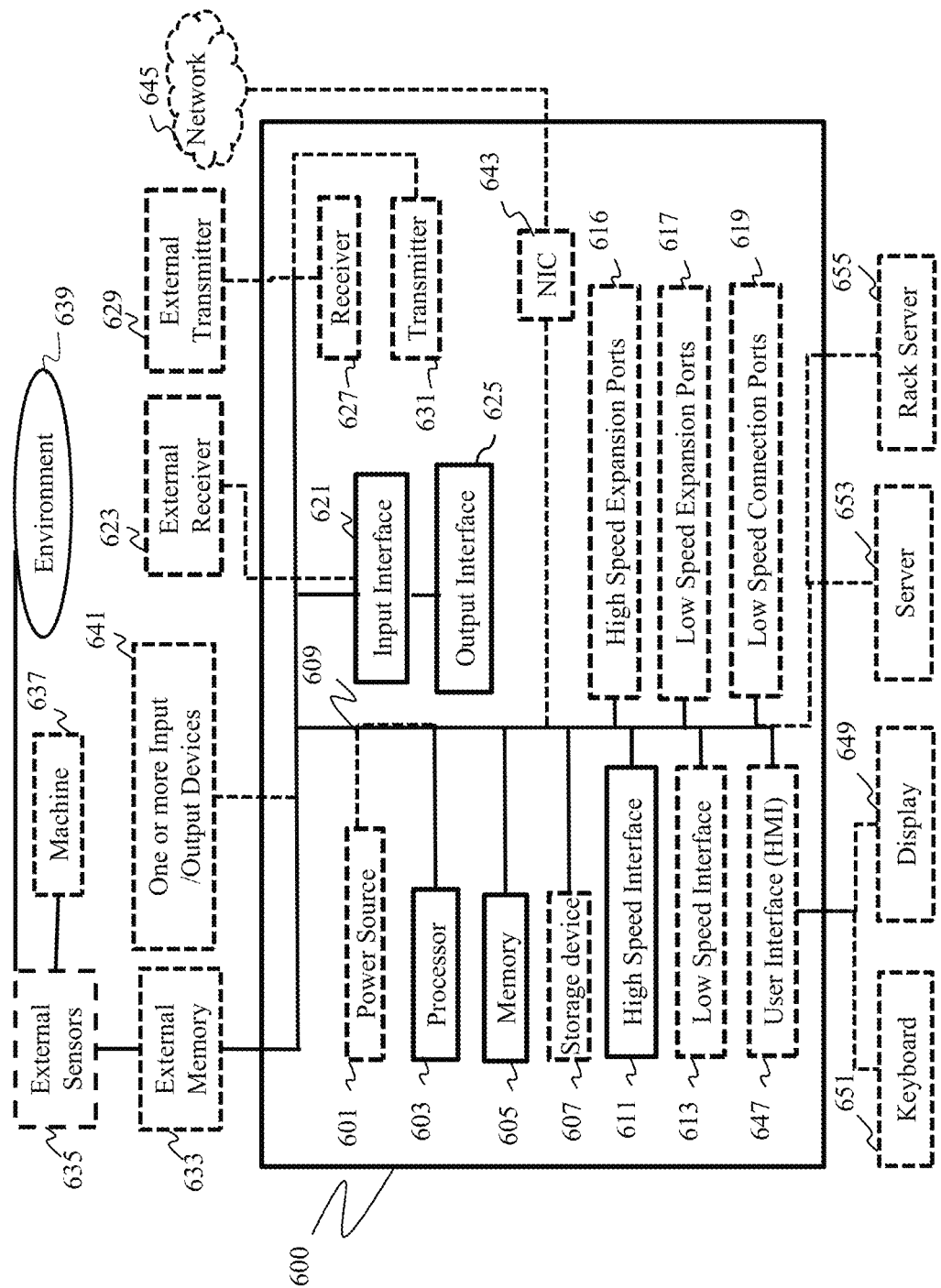
FIG. 6 is a schematic illustrating a computing device for implementing methods and systems of the present disclosure.

FIG. 6 is a schematic illustrating a computing device 600 for implementing the methods and the systems of the present disclosure. The computing device 600 includes a power source 601, a processor 603, a memory 605, a storage device 607, all connected to a bus 609. Further, a high-speed interface 611, a low-speed interface 613, high-speed expansion ports 616 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computer device 600.

The memory 605 can store instructions that are executable by the computer device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 616, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and may also be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus.

Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling motion of a vehicle, comprising:
    a memory configured to store an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle; and
    a processor coupled with executable instructions that, when executed by the processor, cause the control system to:
        collect a signal indicative of objectives of the motion and a value of the disturbances;
        minimize the objective function subject to constraints defined by the objectives of the motion to produce optimized values of the parameters of the sequence of splines; and
        control the motion of the vehicle based on a model of differentially flat dynamics of the vehicle according to an optimal path defined by the optimized values of the parameters of the sequence of splines.

2. The control system of claim 1, wherein the vehicle is one of an autonomous vehicle, a mobile robot, an aerial drone, a ground vehicles, an aerial vehicle, a water surface vehicle, or an underwater vehicle.

3. The control system of claim 1, wherein the motion of the vehicle is parameterized by the sequence of splines as parameterized curves, and wherein the parametrized curves include one or a combination of polynomials; Bezier curves; B-splines; truncated Fourier series; and Legendre polynomials.

4. The control system of claim 1, wherein the objective function is a weighted function of a minimum snap cost, a thrust cost, and a time cost, and wherein the minimum snap cost, the thrust cost, and the time cost are expressed in the parameters defining the sequence of splines.

5. The control system of claim 1, wherein the value of the disturbances is collected from one or a combination of meteorological forecasts, one or more sensors, Computer Fluid Dynamics (CFD) simulations with boundary conditions and a geometry of an environment in which the vehicle is controlled.

6. The control system of claim 5, wherein the processor is further configured to decompose the environment into sets of free space by computing a mesh.

7. The control system of claim 6, wherein the processor is further configured to:
    assign measurements of the disturbances to the sets of free space; and
    determine disturbance parameters based on the measurements assigned to the sets of free space.

8. The control system of claim 7, wherein the processor is further configured to collect new measurements of the disturbances and update the disturbance parameters based on the new measurements of the disturbances.

9. The control system of claim 6, wherein the processor is further configured to:
    expand the sets of free space based on submodular optimization and greedy combination heuristics; and
    determine the constraints based on the expanded sets of free space.

10. The control system of claim 1, wherein dynamics governing the vehicle motion satisfies a property of differential flatness.

11. The control system of claim 1, wherein the vehicle is an aerial vehicle, and the disturbance is modeled as wind and the energy function captures a change in thrust and/or torque caused by a movement of the vehicle in a field of the disturbance as a function of motion parameters.

12. The control system of claim 1, wherein the vehicle is a water surface vehicle, and the disturbance is modeled as wind and ocean currents, and the energy function captures a change in thrust and/or torque caused by a movement of the vehicle in a field of the disturbance as a function of motion parameters.

13. The control system of claim 1, wherein the vehicle is an underwater vehicle, and the disturbance is modeled as ocean currents, and the energy function captures a change in thrust and/or torque caused by a movement of the vehicle in a field of the disturbance as a function of motion parameters.

14. A method for controlling motion of a vehicle, wherein the method uses a processor coupled to a memory storing an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle, the processor is coupled with stored instructions that when executed by the processor carry out steps of the method, comprising:
    collecting a signal indicative of objectives of the motion and a value of the disturbances;
    minimizing the objective function subject to constraints defined by the objectives of the motion to produce optimized values of the parameters of the sequence of splines; and
    controlling the motion of the vehicle based on a model of differentially flat dynamics of the vehicle according to an optimal path defined by the optimized values of the parameters of the sequence of splines.

15. The method of claim 14, wherein the vehicle is one of an autonomous vehicle, a mobile robot, an aerial drone, a ground vehicles, an aerial vehicle, a water surface vehicle, or an underwater vehicle.

16. The method of claim 14, wherein the motion of the vehicle is parameterized by the sequence of splines as parameterized curves, and wherein the parametrized curves include one or a combination of polynomials, Bezier curves, B-splines; truncated Fourier series, and Legendre polynomials.

17. The method of claim 14, wherein the objective function is a weighted function of a minimum snap cost, a thrust cost, and a time cost, and wherein the minimum snap cost, the thrust cost, and the time cost are expressed in the parameters defining the sequence of splines.

18. The method of claim 14, wherein the value of the disturbances is collected from one or a combination of meteorological forecasts, one or more sensors, Computer Fluid Dynamics (CFD) simulations with boundary conditions and a geometry of an environment in which the vehicle is controlled.

19. The method of claim 18, wherein the method further comprises:
  decomposing the environment into sets of free space by computing a mesh;
  assigning measurements of the disturbances to the sets of free space; and
  determining disturbance parameters based on the measurements assigned to the sets of free space.

20. A non-transitory computer readable storage medium embodied thereon a program executable by a processor for performing a method, the storage medium stores an objective function of the parameters defining a sequence of splines representing a path for the motion of the vehicle, wherein a first term of the objective function includes a total variation of the splines and their higher order derivatives, and wherein a second term of the objective function includes an energy function parameterized in the parameters of the sequence of splines and disturbances acting on the vehicle, the program when executed by the processor carry out steps of the method, comprising:
  collecting a signal indicative of objectives of the motion and a value of the disturbances;
  minimizing the objective function subject to constraints defined by the objectives of the motion to produce optimized values of the parameters of the sequence of splines; and
  controlling the motion of the vehicle based on a model of differentially flat dynamics of the vehicle according to an optimal path defined by the optimized values of the parameters of the sequence of splines.

\* \* \* \* \*